US012804368B2

(12) United States Patent
Kanagarathinam et al.

(10) Patent No.: US 12,804,368 B2
(45) Date of Patent: Nov. 17, 2026

(54) SYSTEMS AND METHODS TO MANAGE A PLURALITY OF MHS CLIENTS BY AN MHS HOST

(71) Applicant: Samsung Electronics Co., Ltd., Suwon-si (KR)

(72) Inventors: Madhan Raj Kanagarathinam, Bangalore (IN); Manoj R Hebbar, Bangalore (IN); Mayank Kumar Sahu, Bangalore (IN); Sri Vinod Palacharla, Bangalore (IN); Jayendra Reddy Kovvuri, Bangalore (IN); Rukmini Gn, Bangalore (IN); Farooq Hussain Sahebzad, Bangalore (IN); Ashish Kumar, Bangalore (IN); Srihari Sriram, Bangalore (IN); Seshu Babu Maddineni, Bangalore (IN); Jungkuk Seo, Suwon-si (KR); Ankit Sudhirchandra Vakil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 18/672,961

(22) Filed: May 23, 2024

(65) Prior Publication Data

US 2024/0314532 A1 Sep. 19, 2024

Related U.S. Application Data

(63) Continuation of application No. PCT/KR2024/002185, filed on Feb. 20, 2024.

(30) Foreign Application Priority Data

Feb. 28, 2023 (IN) ............................ 202341013544

(51) Int. Cl.
*H04W 4/50* (2018.01)
*H04W 24/08* (2009.01)

(52) U.S. Cl.
CPC ............. *H04W 4/50* (2018.02); *H04W 24/08* (2013.01)

(58) Field of Classification Search
CPC .... H04M 15/28; H04M 15/853; H04M 15/61; H04M 15/857; H04M 15/88;
(Continued)

(56) References Cited

U.S. PATENT DOCUMENTS

| | | | | |
|---|---|---|---|---|
| 9,439,061 | B2 * | 9/2016 | Austin | H04W 48/18 |
| 10,021,593 | B2 | 7/2018 | Bouillet | |

(Continued)

FOREIGN PATENT DOCUMENTS

| | | | | |
|---|---|---|---|---|
| EP | 3343962 A1 * | 7/2018 | | H04W 88/04 |
| EP | 4099741 | 12/2022 | | |
| KR | 102246586 B1 * | 4/2021 | | H04W 4/80 |

OTHER PUBLICATIONS

Search Report and Written Opinion dated Jun. 10, 2024 issued in International Patent Application No. PCT/KR2024/002185.

(Continued)

*Primary Examiner* — Dung Hong
(74) *Attorney, Agent, or Firm* — Nixon & Vanderhye P.C.

(57) ABSTRACT

Disclosed is a method implemented in an MHS host for managing a plurality of MHS clients. The method includes: monitoring the plurality of MHS clients connected to the MHS host and a data usage of each of the plurality of MHS clients; displaying a list of the plurality of MHS clients and a statistic of the data usage of the plurality of MHS clients; providing an option to manage an MHS client from the plurality of MHS clients; providing, based on a selection of the MHS client, an option to set one at least one of a data (Continued)

limit or a time limit for the metered data usage for the selected MHS client; and controlling the data usage of the selected MHS client based on setting of the data limit or the time limit.

16 Claims, 17 Drawing Sheets

(58) Field of Classification Search
CPC ... H04M 15/852; H04W 48/02; H04W 72/56; H04W 16/02
See application file for complete search history.

(56) References Cited

U.S. PATENT DOCUMENTS

| | | | | |
|---|---|---|---|---|
| 10,104,505 | B2 | 10/2018 | Gallegos et al. | |
| 10,187,913 | B2 | 1/2019 | Tran Le et al. | |
| 11,297,477 | B2 | 4/2022 | Won | |
| 2011/0294502 | A1* | 12/2011 | Oerton | H04W 4/60 455/426.1 |
| 2012/0240197 | A1* | 9/2012 | Tran | H04W 4/00 726/4 |
| 2013/0171964 | A1* | 7/2013 | Bhatia | H04W 12/08 455/411 |
| 2013/0346624 | A1 | 12/2013 | Chervets et al. | |
| 2015/0011179 | A1* | 1/2015 | Won | H04W 4/80 455/405 |
| 2015/0103708 | A1* | 4/2015 | Kang | H04W 4/80 370/329 |
| 2016/0127902 | A1 | 5/2016 | Ciarniello et al. | |
| 2016/0366557 | A1 | 12/2016 | Gallegos et al. | |
| 2020/0154253 | A1* | 5/2020 | Won | H04W 4/80 |

OTHER PUBLICATIONS

Indian First Examination Report issued Apr. 13, 2026 in corresponding Indian Patent Application No. 202341013544.

* cited by examiner

SYSTEMS AND METHODS TO MANAGE A PLURALITY OF MHS CLIENTS BY AN MHS HOST

CROSS-REFERENCE TO RELATED APPLICATIONS

This application is a continuation of International Application No. PCT/KR2024/002185 designating the United States, filed on Feb. 20, 2024, in the Korean Intellectual Property Receiving Office and claiming priority to Indian Provisional Patent Application No. 202341013544, filed on Feb. 28, 2023, in the Indian Patent Office, and to Indian Complete Patent Application No. 202341013544, filed on Feb. 12, 2024, in the Indian Patent Office, the disclosures of each of which are incorporated by reference herein in their entireties.

BACKGROUND

Field

The disclosure relates to wireless communication networks, and for example, relates to systems and methods to manage a plurality of Mobile Hotspot (MHS) clients by an MHS host.

Description of Related Art

The current landscape of internet access technology demands advancement, as in the current scenario, the existing infrastructure and methods are proving incapable of meeting customer requirements, such as uninterrupted and fast mobile broadband, which can be experienced in many facets of day-to-day life. For example, at most of the rented housing establishments, such as the hostel, Wi-Fi is slow as several users are accessing the same bandwidth with little or no control over the sharing pattern. Thus, to meet the user requirements, a mobile hotspot may be provided to access the internet. Further, in a few scenarios such as in educational institutes, where the internet is shared via the mobile hotspot, a control may be required to safeguard against unauthorized access.

Further, the conventional mobile hotspot methods, often fail to address the above discussed problems. The conventional mobile hotspot methods face several issues including an unstable Wi-Fi network, causing interruptions and resulting in a poor user experience for users. Additionally, the current solution also fails to provide an effective tool for sharing the internet with strangers without compromising on the host's control to manage such access by said strangers. Furthermore, the conventional mobile hotspot methods also fail to provide effective tools to view, manage, and control data usage in a shared environment.

Further, the conventional mobile hotspot methods do not provide much control over the connected users due to offloading techniques. At the host user, the packet does not reach IP layers if the software-based offloading is enabled. The current smartphone user may prefer to control the data only when the backhaul or the upstream is a metered interface. If the upstream is a non-metered interface, then the data usage and control might not be helpful.

Therefore, there lies a need for an improved method and device that can address the above-discussed limitations and problems associated with managing soft access point connected clients.

The above information is presented as background information only to assist with an understanding of the disclosure. No determination has been made, and no assertion is made, as to whether any of the above might be applicable as prior art with regard to the disclosure.

SUMMARY

In an example embodiment, a method implemented in a Mobile Hotspot (MHS) host for managing a plurality of MHS clients is disclosed. The method includes: monitoring the plurality of MHS clients connected to the MHS host and a data usage of each of the plurality of MHS clients; displaying, on a display screen of the MHS host, a list of the plurality of MHS clients and a statistic of the data usage of the plurality of MHS clients; providing, on the display screen, an option to manage an MHS client from the plurality of MHS clients; receiving a first input indicative of a selection of the MHS client from the plurality of MHS clients; providing, on the display screen based on the selection of the MHS client, an option to set one of a data limit for metered data usage or a time limit for the metered data usage for the selected MHS client; receiving a second input indicative of a setting of the data limit or the time limit for the selected MHS client; and controlling the data usage of the selected MHS client based on the setting of the data limit or the time limit.

According to an example embodiment, a Mobile Hotspot (MHS) host for managing a plurality of MHS clients is disclosed. The MHS host includes: at least one processor, comprising processing circuitry, and a display screen coupled with at least one processor; wherein at least one processor, individually and/or collectively, is configured to: monitor a plurality of MHS clients connected to the MHS host and a data usage of each of the plurality of MHS clients control the display, to display a display screen of the MHS host, a list of the plurality of MHS clients and a statistic of the data usage of each of the plurality of MHS clients; provide, on the display screen, an option to manage an MHS client from the plurality of MHS clients; receive a first input indicative of a selection of the MHS client from the plurality of MHS clients; provide, on the display screen based on the selection of the MHS client, an option to set one of a data limit for metered data usage or a time limit for the metered data usage for the selected MHS client; receive a second input indicative of a setting of the data limit or the time limit for the selected MHS client; and control the data usage of the selected MHS client based on the setting of the data limit or the time limit.

To further clarify various advantages and features of the present disclosure, a more detailed description will be rendered with reference to various example embodiments thereof, which are illustrated in the appended drawings. It will be appreciated that these drawings illustrate example embodiments and are therefore not to be considered limiting of its scope. The disclosure, including various example embodiments, will be described and explained with additional specificity and detail below with reference to the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which like reference numerals refer to like parts throughout the drawings, in which.

Figure 1:
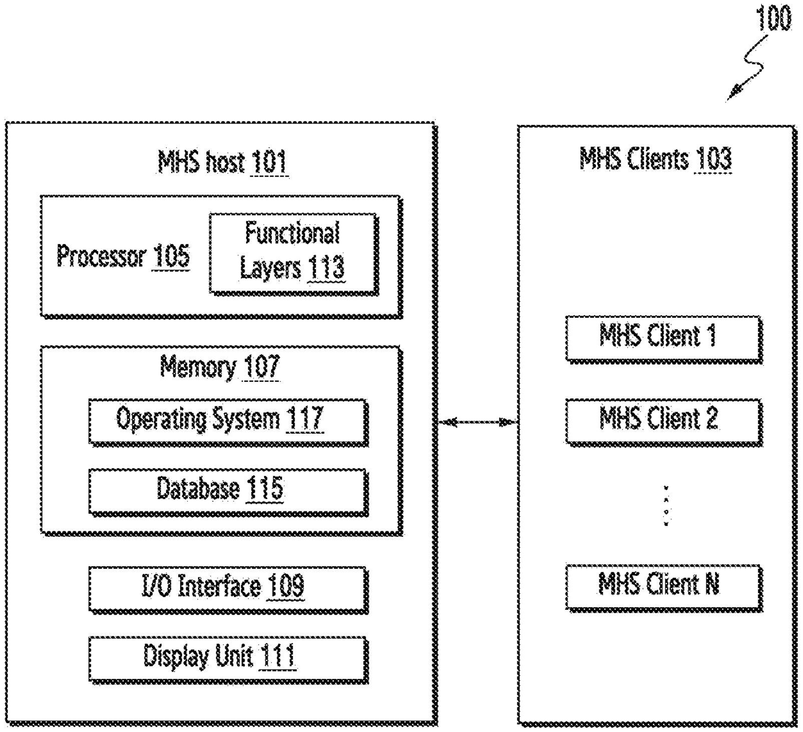
FIG. 1 is a block diagram illustrating an example configuration of a system to manage a plurality of Mobile Hotspot (MHS) clients by an MHS host, according to various embodiments.

Further, skilled artisans will appreciate that elements in the drawings are illustrated for simplicity and may not have necessarily been drawn to scale. For example, the flowcharts illustrate the method in terms of steps involved to aid in improving understanding of aspects of the present disclosure. Furthermore, in terms of the construction of the device, one or more components of the device may have been represented in the drawings by conventional symbols, and the drawings may show those specific details that are pertinent to understanding embodiments of the present disclosure so as not to obscure the drawings with details that will be readily apparent to those of ordinary skill in the art having the benefit of the description herein.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~ module', '~ unit', '~ part', '~ body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN), Institute of Electrical and Electronics Engineers (IEEE) or the like), but it is only of an example for explanation, and the various embodiments of the disclosure may be easily modified even in other communication systems and applied thereto.

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with an embodiment being included in at least one embodiment of the present disclosure. Thus, appearances of the phrase "in an embodiment", "in another embodiment", and similar language throughout this disclosure may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components preceded by "comprises . . . a" does not, without more constraints, preclude the existence of other devices or other sub-systems or other elements or other structures or other components or additional devices or additional sub-systems or additional elements or additional structures or additional components.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. Also, the various example embodiments described herein are not necessarily mutually exclusive, as various embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the disclosure herein.

Various example embodiments may be described and illustrated in terms of modules that carry out a described function or functions. These modules, which may be referred to herein as units or blocks or the like, or may include blocks or units, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits of a block may be implemented by dedicated hardware, by a processor (e.g. one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the various example embodiments may be physically combined into more complex blocks without departing from the scope of the disclosure.

The accompanying drawings are used to aid in easily understanding various technical features and the disclosure presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally used to distinguish one element from another.

Various example embodiments will be described below in greater detail with reference to the accompanying drawings.

FIG. 1 is a block diagram illustrating an example configuration of a system 100 to manage a plurality of Mobile Hotspot (MHS) clients 103 by an MHS host 101, according to various embodiments.

The system 100 includes the MHS host 101 and a plurality of MHS clients 103. The MHS host 101 includes a processor (e.g., including processing circuitry) 105, a memory 107, an input/output interface (e.g., including interface circuitry) 109, and a display unit (e.g., including a display) 111. The memory 107 may include a database 115 and an operating system 117.

The processor(s) 105 can be a single processing unit or several units, all of which could include multiple computing units. The processor 105 may be implemented as one or more microprocessors, microcomputers, microcontrollers, digital signal processors, central processing units, state machines, logic circuitries, and/or any devices that manipulate signals based on operational instructions. Among other capabilities, the processor 105 is configured to fetch and execute computer-readable instructions and data stored in the memory 107. Further, the processor 105 controls functions of one or more functional layers 113. For example, the processor 105 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when “a processor”, “at least one processor”, and “one or more processors” are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 107 includes one or more computer-readable storage media. The memory 107 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term “non-transitory” may indicate that the storage medium is not embodied in a carrier wave or a propagated signal. However, the term “non-transitory” should not be interpreted to mean that the memory is non-movable. In certain examples, a non-transitory storage medium may store data that can, over time, change (e.g., in Random Access Memory (RAM) or cache.

The memory 107 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The database 115 stores the information as required by the functional layers 113 and the processor 105 performs one or more functions. Further, the database 115 may store one or more values, such as, but not limited to, intermediate information generated by the functional layers 113, parameters required for the functional layers 113, threshold values, etc.

Further, the memory 107 includes an operating system 117 for performing one or more tasks of the MHS host 101, as performed by a generic operating system in the communications domain.

The I/O Interface 109 may refer to hardware (e.g., circuitry) and/or software components that enable data communication between the MHS host 101 and the plurality of MHS clients 103. The I/O Interface 109 serves as a communication medium for exchanging information, commands, or data with the other devices or systems. The I/O Interface 109 may be a part of the processor 105 or maybe a separate component. The I/O Interface 109 may be created in software or maybe a physical connection in hardware. The I/O Interface 109 may be configured to connect with an external network, external media, the display, or any other components, or combinations thereof. The external network may be a physical connection, such as a wired Ethernet connection, or may be established wirelessly.

The display unit 111 may include a display and may be configured to display the content and user interface to the MHS host 101. The display unit 113 may include a display screen. As a non-limiting example, the display screen may be Light Emitting Diode (LED), Liquid Crystal Display (LCD), Organic Light Emitting Diode (OLED), Active Matrix Organic Light Emitting Diode (AMOLED), or Super Active Matrix Organic Light Emitting Diode (AMOLED) screen. The display screen may be of varied resolutions.

In various embodiments, the processor 105 may control the one or more functional layers 113 to perform one or more functions of the MHS host 101.

The processor 105 monitors the plurality of MHS clients 103 connected to the MHS host 101. The processor 105 also monitors data usage of each of the plurality of MHS clients 103. Also, the processor 105 displays a list of the plurality of MHS clients 103 and a statistic of the data usage of the plurality of MHS clients 103 on the display screen.

Further, the processor 105 provides, on the display screen, an option to manage an MHS client from the plurality of MHS clients 103. For instance, the processor 105 may display a plurality of selectable icons corresponding to the plurality of MHS clients 103 in the list. The MHS host 101 may select the MHS client based on the selection operation on the plurality of selectable icons. The processor 105 may receive a first user input indicative of a selection of the MHS client from the plurality of MHS clients 103.

Further, the processor 105 provides, on the display screen based on the selection of the MHS client, an option, for a user of the MHS client 101, to set one of a data limit or a time limit for the metered data usage for the selected MHS client. For instance, the processor 105 may enable the MHS host 101 to input the data limit or the time limit for the metered data usage for the selected MHS client. The processor 105 may receive a second user input indicative of a setting of the data limit or the time limit for the selected MHS client. Thereafter, the processor 105 controls the data usage of the selected MHS client based on the setting of the data limit or the time limit.

In various embodiments, the processor 105 may also display real-time data usage of the plurality of MHS clients 103 and an overall data limit for the plurality of MHS clients 103. The processor 105 may provide an option on the display screen to set or modify the overall data limit for the plurality of MHS clients 103. For instance, the processor 105 may enable the MHS host 101 to input or modify the overall data limit for the plurality of MHS clients 103. The processor 105 may receive a third user input indicative of a setting or modification of the overall data limit. The processor 105 controls the data usage of the plurality of MHS clients 103 based on the modified overall data limit.

Figure 2:
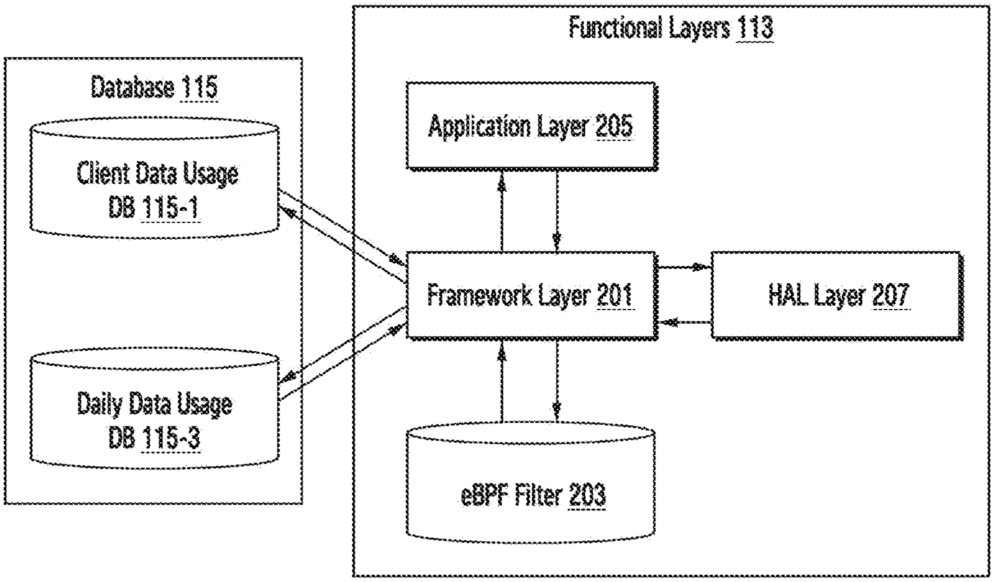
FIG. 2 illustrates a block diagram illustrating an example configuration of the MHS host of FIG. 1, according to various embodiments.

FIG. 2 is a diagram illustrating an example configuration of the MHS host 101 of FIG. 1, according to various embodiments. As shown in FIG. 2 the functional layers 113 include a framework layer 201, an eBPF filter 203, an application layer 205, and a hardware abstraction (HAL) layer 207. Further, the database 115 includes a client usage database 115-1 and a daily data usage database 115-3.

The framework layer 201 periodically receives information of the data usage of the plurality of MHS clients 103. For instance, the framework layer 201 requests the eBPF filter 203 for client data usage of the plurality of MHS clients 103 and other information at a first predefined interval (T1). The eBPF filter 203 provides the information of the data usage of the plurality of MHS clients 103 and the other information to the framework layer 201 based on the received request.

The framework layer 201 stores the information of the data usage of the plurality of MHS clients 103 and the other information at a second predefined interval (T2) in the client data usage database 115-1. The framework layer 201 also stores the daily data usage of the plurality of MHS clients

103 in the daily data usage database 115-3. In a non-limiting example, the second predefined interval (T2) is greater than the first predefined interval (T1).

The application layer 205 requests the data usage of the plurality of MHS clients 103 from framework layer 201. The framework layer 201 extracts the information of the data usage of the plurality of MHS clients 103 from the client usage database 115-1 and/or the daily data usage database 115-3. The framework layer 201 then provides the extracted information of the data usage to the application layer 205. For instance, the framework layer 201 requests the client usage database 115-1 and/or the daily data usage database 115-3 for the information of the data usage and receives the information of the data usage based on the request.

The framework layer 201 interacts with the HAL layer 207 during managing the data usage of the plurality of MHS clients 103.

Figure 3:
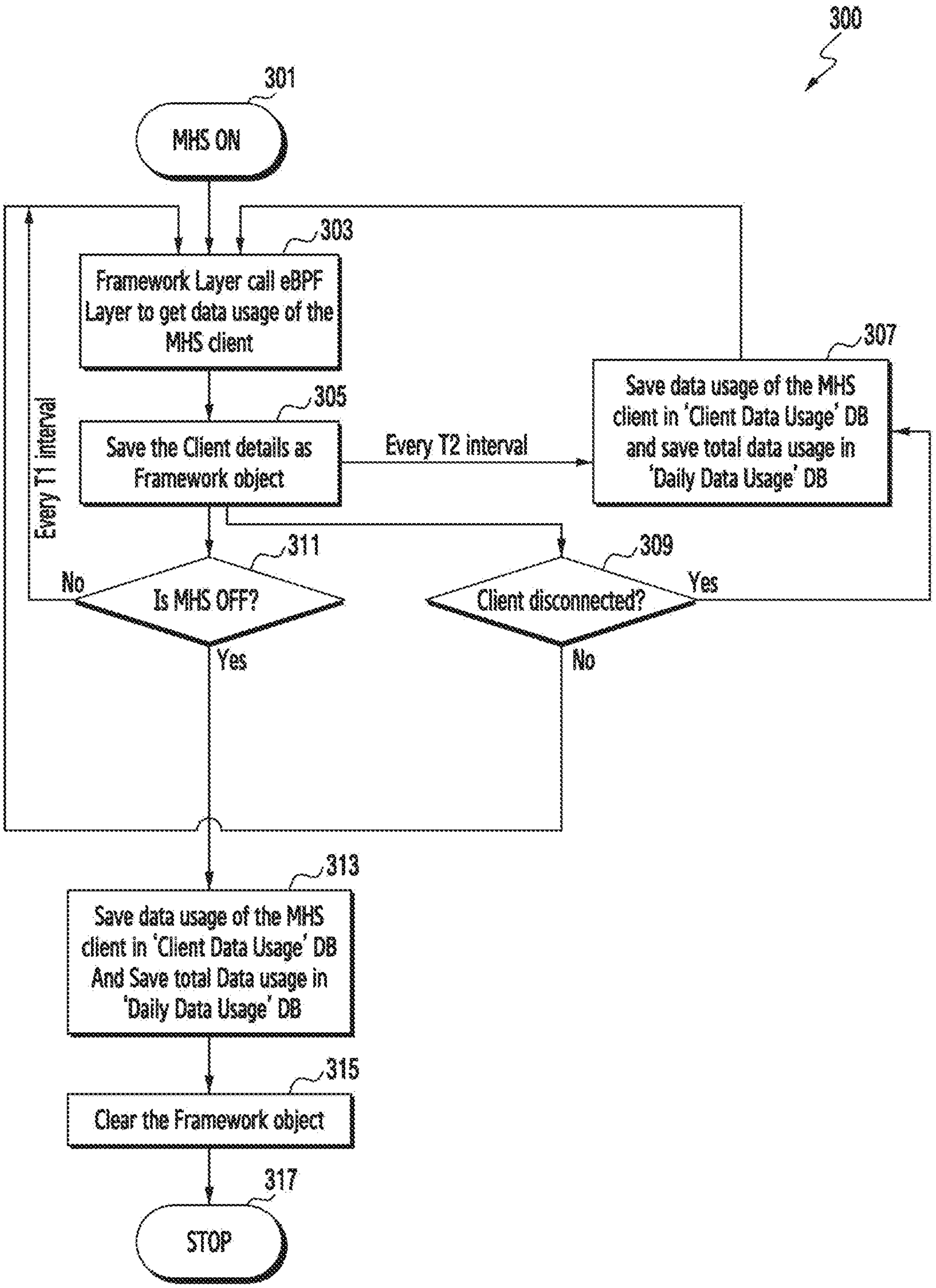
FIG. 3 is a flowchart illustrating an example operation of monitoring data usage of the MHS client, according to various embodiments.

FIG. 3 is a flowchart 300 illustrating example operations for monitoring data usage of the MHS client, according to various embodiments. The flowchart 300 includes a series of operations 301 through 317 that may be performed, for example, by the processor 105.

At step 301, a Mobile Hot Spot (MHS) is turned on to connect the MHS host 101 and the plurality of MHS clients 103.

At step 303, the framework layer 201 requests the eBPF filter 203 to provide the data usage of the MHS client and other information. The eBPF filter 203 provides the data usage of the MHS client and the other information, that is stored in a low-level database, to the framework layer 201 based on the received request.

At step 305, the framework layer 201 receives the data usage of the MHS client and the other information from the eBPF filter 203 and saves the MHS client detail as a framework object.

At step 307, the framework layer 201 periodically stores, at the second predefined interval (T2), the data usage of the MHS client in the client data usage database 115-1 and total data usage in the daily data usage database 115-3.

At step 309, the framework layer 201 determines whether the MHS client is connected or not. For instance, the framework layer 201 may determine a state of connection between the MHS host 101 and the MHS client. If it is determined that the MHS client is in a connected state, the flowchart 300 goes to step 307. However, if it is determined that the MHS client is in a disconnected state, the flowchart 300 returns to step 303.

At step 311, the framework layer 201 determines whether the MHS is turned off or not. If it is determined that the MHS is turned off, the flowchart 300 proceeds to step 313. However, if it is determined that the MHS is ON, the flowchart 300 returns to step 303. The framework layer 201 determines the status of the MHS periodically at the first predefined interval (T1).

At step 313, the framework layer 201 stores the data usage of the MHS client in the client data usage database 115-1 and total data usage in the daily data usage database 115-3.

At step 315, the framework layer 201 clears the framework object, and the flowchart 300 ends at step 317.

Figure 4:
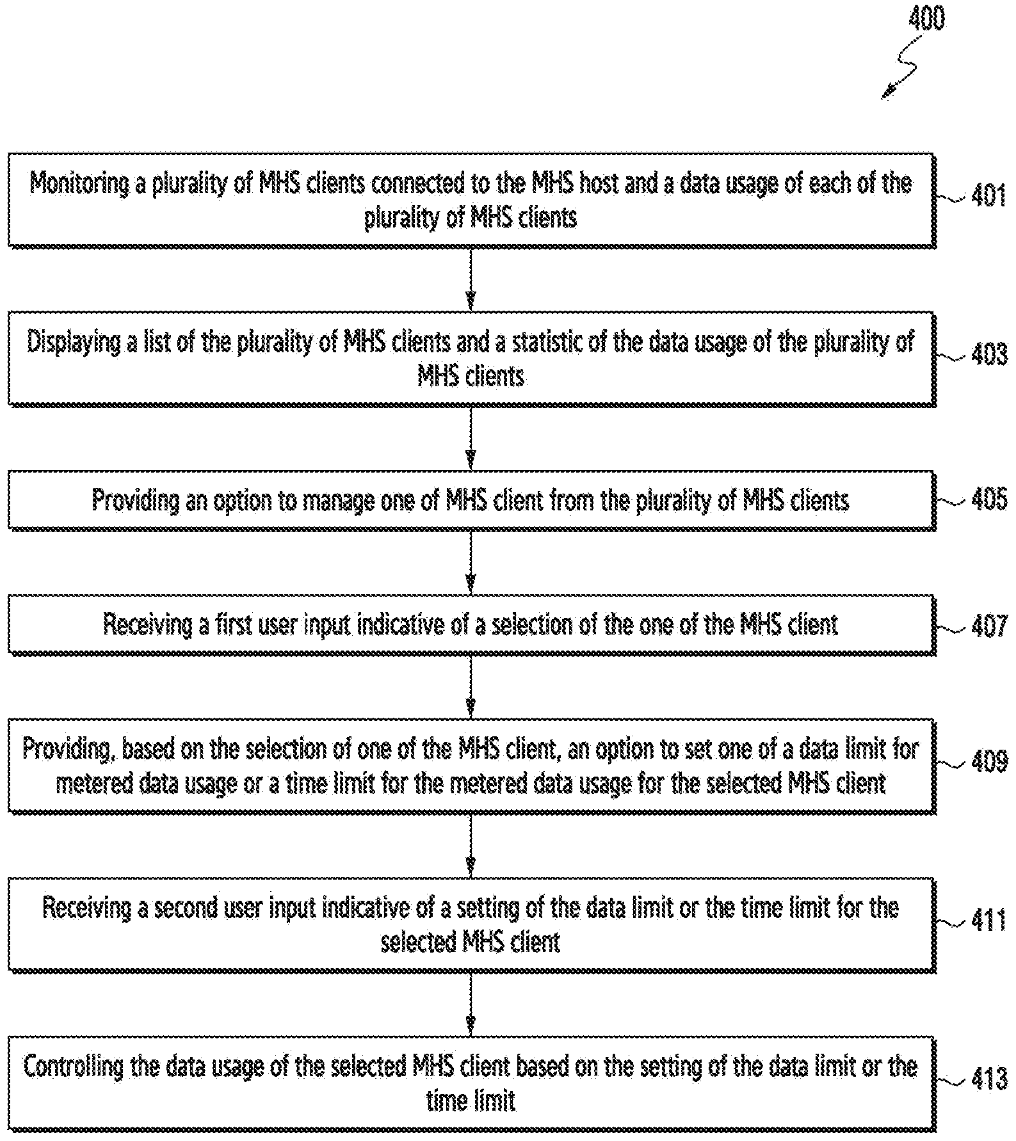
FIG. 4 is a flowchart illustrating an example method for managing the plurality of MHS clients, according to various embodiments.

FIG. 4 is a flowchart illustrating an example method 400 for managing the plurality of MHS clients 103, according to various embodiments. The method 400 includes a series of operations 401 through 413 that may be performed, for example, by the processor 105.

At step 401, the processor 105 monitors the plurality of MHS clients 103 connected to the MHS host 101 and the data usage of each of the plurality of MHS clients 103. For instance, the framework layer 201 and the eBPF filter 203 may perform the monitoring of the connection state and the data usage of each MHS client of the plurality of MHS clients 103.

At step 403, the processor 105 displays on the display screen of the MHS host 101, the list of the plurality of MHS clients 103 the statistic of the data usage of the plurality of MHS clients 103. For instance, the application layer 205 may perform the processing to display the list of the plurality of client devices currently connected to the MHS host 101 on the display screen of the MHS host 101.

At step 405, the processor 105 provides, on the display screen, the option to manage or select the MHS client from the plurality of MHS clients 103. For instance, the processor 105 may display the plurality of selectable icons corresponding to the plurality of MHS clients 103 in the list. The MHS host 101 may manage or select the MHS client based on the selection operation on the plurality of selectable icons.

In various embodiments, the application layer 205 may perform the processing related to controlling of the display screen of the MHS host 101. In a non-limiting example, the list of the plurality of MHS clients 103 may be displayed on the display screen through various means, such as icons or pop-ups. Further, the application layer 205 may generate a User Interface (UI) including a display of the plurality of MHS clients 103. The provided options may be accessible via the UI or a dashboard.

At step 407, the processor 105 receives the first user input indicative of the selection of the MHS client. In a non-limiting example, the first user input may be received using various manners such as a voice command input, a touch input, or any other input method. The flow of the method 400 now proceeds to step 409.

At step 409, the processor 105 provides, on the display screen based on the selection of the MHS client, the option to set at least one of the data limit and/or the time limit for the metered data usage for the selected MHS client. For instance, the processor 105 may enable the MHS host 101 to input the data limit or the time limit for the metered data usage for the selected MHS client. The processor 105 may display the UI that includes an input field to input the data limit or the time limit.

At step 411, the processor 105 receives the second user input indicative of the setting of at least one of the data limit and/or the time limit for the selected MHS client. For instance, the data limit or the time limit for the selected MHS client may be set for per day, per month, or any selective duration. In a non-limiting example, the second user input may be received using various manners such as the voice command input, the touch input, or any other input method. The flow of the method 400 now proceeds to step 413.

At step 413, the processor 105 controls the data usage of the selected MHS client based on the set data limit and/or the time limit. The processor 105 may control the data usage of the selected MHS client by controlling the connection between the client device and the MHS host 101. The controlling of the connection may include one of pausing or resuming the connection between the client device and the MHS host 101. For instance, the framework layer 201 may control the eBPF filter 203 to pause or resume the connection between the client device and the MHS host 101.

Figure 5:
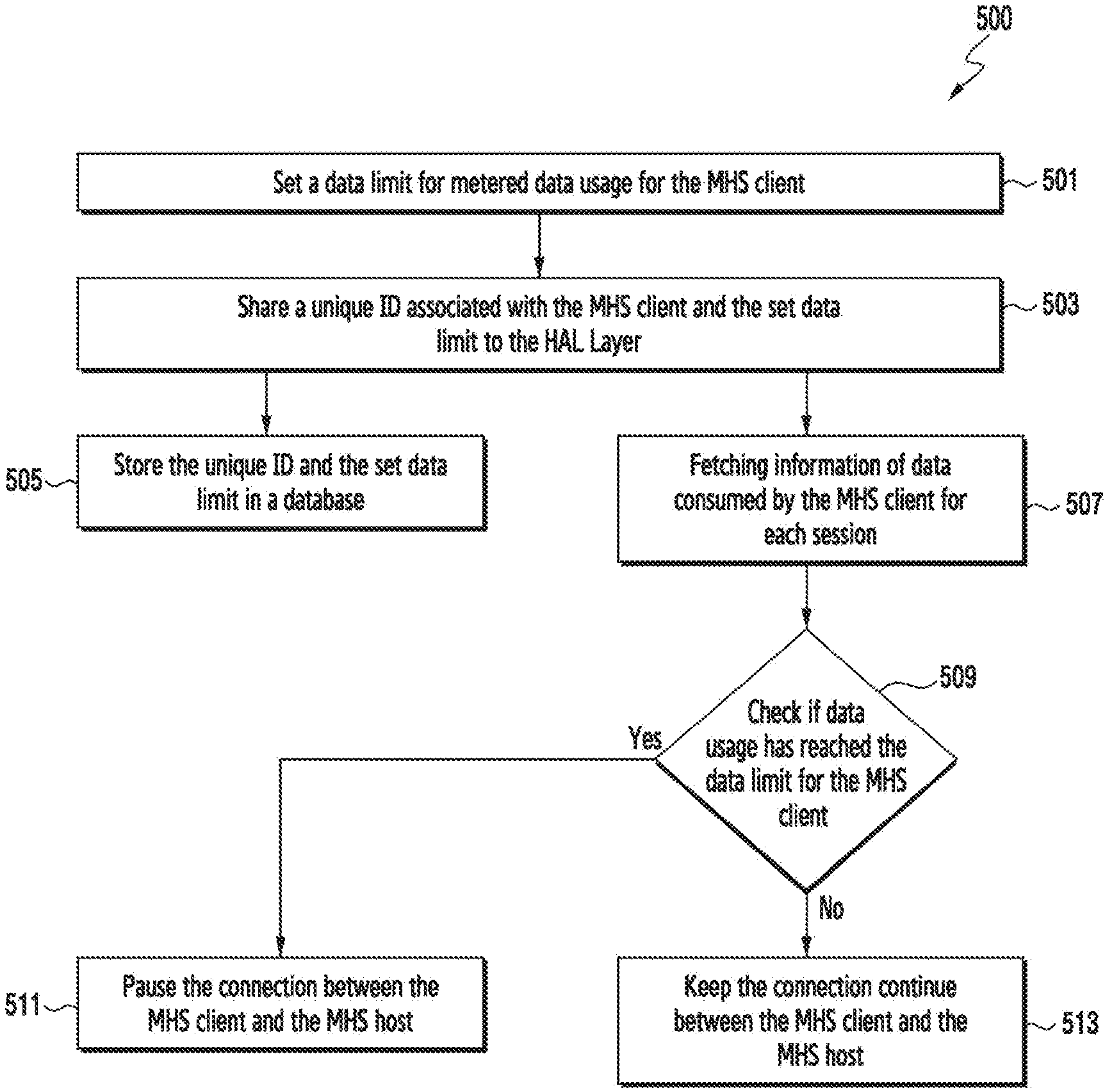
FIG. 5 is a flowchart illustrating example operations for controlling the data usage of the MHS client based on a set data limit, according to various embodiments.

FIG. 5 is a flowchart 500 illustrating example operations for controlling the data usage of the MHS client based on the set data limit, according to various embodiments. The flowchart 500 includes a series of operations 501 through 513 performed by the processor 105.

At step 501, the processor 105 sets the data limit for metered data usage for the selected MHS client. For instance, the processor 105 may enable the MHS host 101 to input or modify the data limit for metered data usage for the selected MHS client by generating and displaying the UI including the input field to input the data limit. The processor 105 may receive a user input, via the UI, indicative of the adding or modifying of the data limit for the selected MHS client. The processor 105 may then set the data limit for the selected MHS client based on the received user input.

At step 503, the processor 105 controls the framework layer 201 to share a unique ID associated with the selected MHS client and the set data limit for the selected MHS client to the HAL layer 207.

At step 505, the processor 105 stores the unique ID associated with the selected MHS client and the set data limit in the database 115 of the MHS host 101. For instance, the framework layer 201 updates the database 115 with the set data limit and the unique ID.

At step 507, the processor 105 fetches information of the metered data consumed by selected MHS client for each session. For instance, the set data limit for the metered usage is shared with the eBPF filter 203. The information of the metered data consumed by the selected MHS client may be fetched by the framework layer 201 from the eBPF filter 203.

At step 509, the processor 105 checks if the metered data usage has reached the set data limit for the selected MHS client. The processor 105 may compare the data consumed by the selected MHS client with the set data limit. The processor 105 may further control the connection between the MHS host 101 and the selected MHS client based on a result of the comparison. For instance, the eBPF filter 203 checks the metered data usage in ingress and egress (incoming and outgoing packets). If the metered data usage has reached the set data limit for the selected MHS client, the flow of the process proceeds to step 511. Further, if the metered data usage has not reached the set data limit for the selected MHS client, the flow of the process proceeds to step 513.

At step 511, the processor 105 pauses the connection between the MHS client and the MHS host 101. For instance, the framework layer 201 may control the eBPF filter 203 to pause the connection between the MHS client and the MHS host 101. The eBPF filter 203 may pause the connection by dropping all data packets in an ingress filter and an egress filter of the eBPF filter 203. The dropping of packet may refer to not allowing the transfer of the data packets between the selected MHS client and the MHS host 101.

At step 513, the processor 105 may continue or resume the connection between the MHS client and the MHS host 101. For instance, the framework layer 201 may control the eBPF filter 203 to continue or resume the connection between the MHS client and the MHS host 101. The eBPF filter 203 may continue or resume the connection by allowing all data packets in the ingress filter and the egress filter of the eBPF filter 203.

Figure 6:
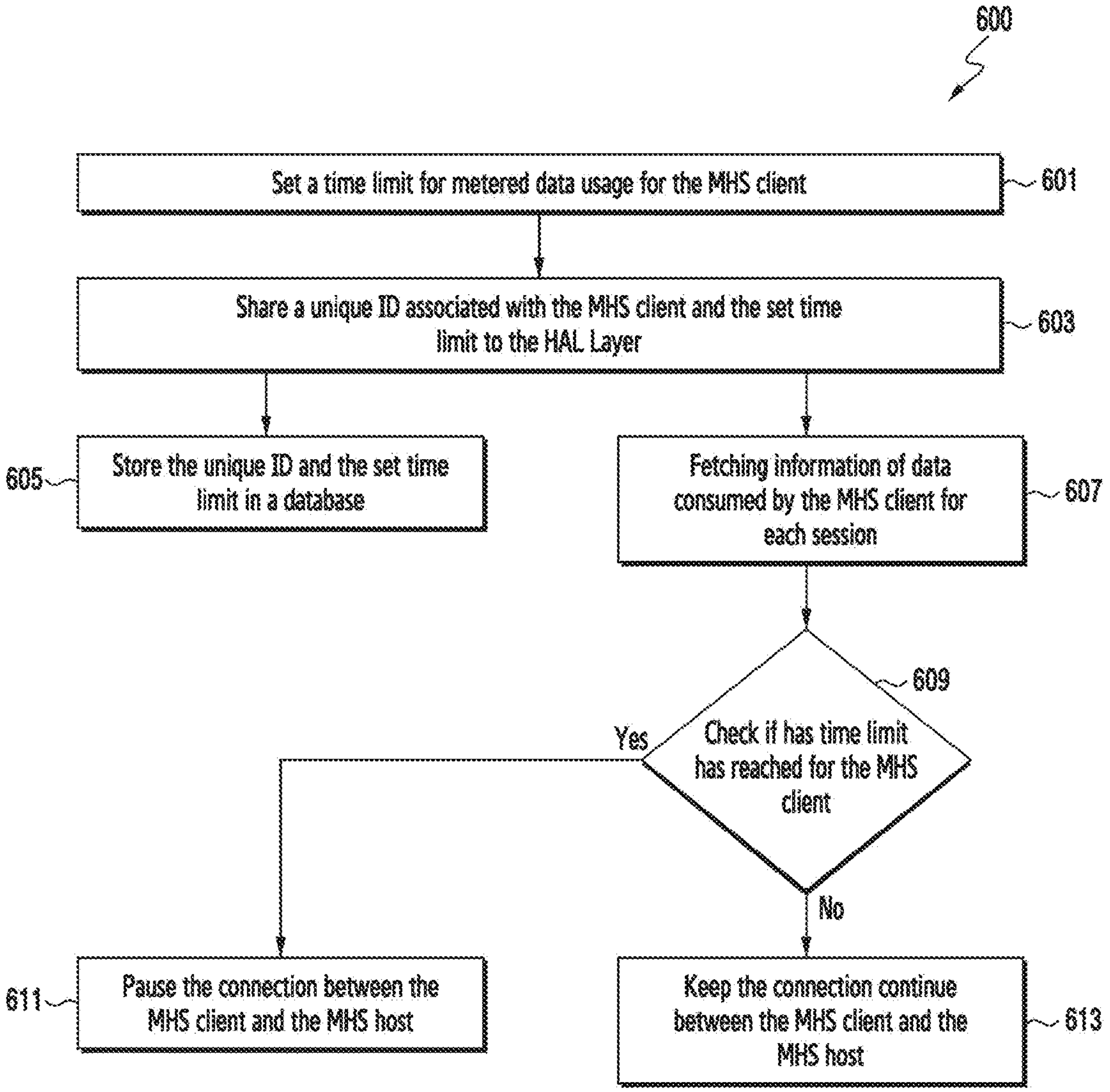
FIG. 6 illustrates a flowchart illustrating example operations for controlling the data usage of the MHS client based on a set time limit, according to various embodiments.

FIG. 6 is a flowchart 600 illustrating example operations for controlling the data usage of the MHS client based on the set time limit, according to various embodiments. The flowchart 600 includes a series of operations 601 through 613 performed by the processor 105.

At step 601, the processor 105 sets the time limit for metered data usage for the selected MHS client. For instance, the processor 105 may enable the MHS host 101 to input or modify the time limit for metered data usage for the selected MHS client by generating and displaying the UI including the input field to input the time limit. The processor 105 may receive a user input, via the UI, indicative of the adding or modifying of the time limit for the selected MHS client. The processor 105 may then set the time limit for the selected MHS client based on the received user input.

At step 603, the processor 105 controls the framework layer 201 to share the unique ID associated with the selected MHS client and the set time limit for the selected MHS client to the HAL layer 207.

At step 605, the processor 105 stores the unique ID associated with the selected MHS client and the set time limit in the database 115 of the MHS host 101. For instance, the framework layer 201 updates the database 115 with the set time limit and the unique ID.

At step 607, the processor 105 fetches information of usage time of the metered data consumed by selected MHS client for each session. For instance, the set time limit for the metered usage is shared with the eBPF filter 203. The information of the usage time of the metered data consumed by the selected MHS client may be fetched by the framework layer 201 from the eBPF filter 203.

At step 609, the processor 105 checks if the set time limit has reached for the selected MHS client. The processor 105 may compare the usage time of the data consumed by the selected MHS client with the set time limit. The processor 105 may further control the connection between the MHS host 101 and the selected MHS client based on a result of the comparison. For instance, if the set time limit for the metered data usage has reached for the selected MHS client, the flow of the process proceeds to step 611. Further, if the set time limit for the metered data usage has not reached for the selected MHS client, the flow of the process proceeds to step 613.

At step 611, the processor 105 pauses the connection between the MHS client and the MHS host 101. For instance, the framework layer 201 may control the eBPF filter 203 to pause the connection between the MHS client and the MHS host 101. The eBPF filter 203 may pause the connection by dropping all data packets in the ingress filter and the egress filter of the eBPF filter 203. The dropping of packet may refer to not allowing the transfer of the data packets between the selected MHS client and the MHS host 101.

At step 613, the processor 105 may continue or resume the connection between the MHS client and the MHS host 101. For instance, the framework layer 201 may control the eBPF filter 203 to continue or resume the connection between the MHS client and the MHS host 101. The eBPF filter 203 may continue or resume the connection by allowing all data packets in the ingress filter and the egress filter of the eBPF filter 203.

Figure 7:
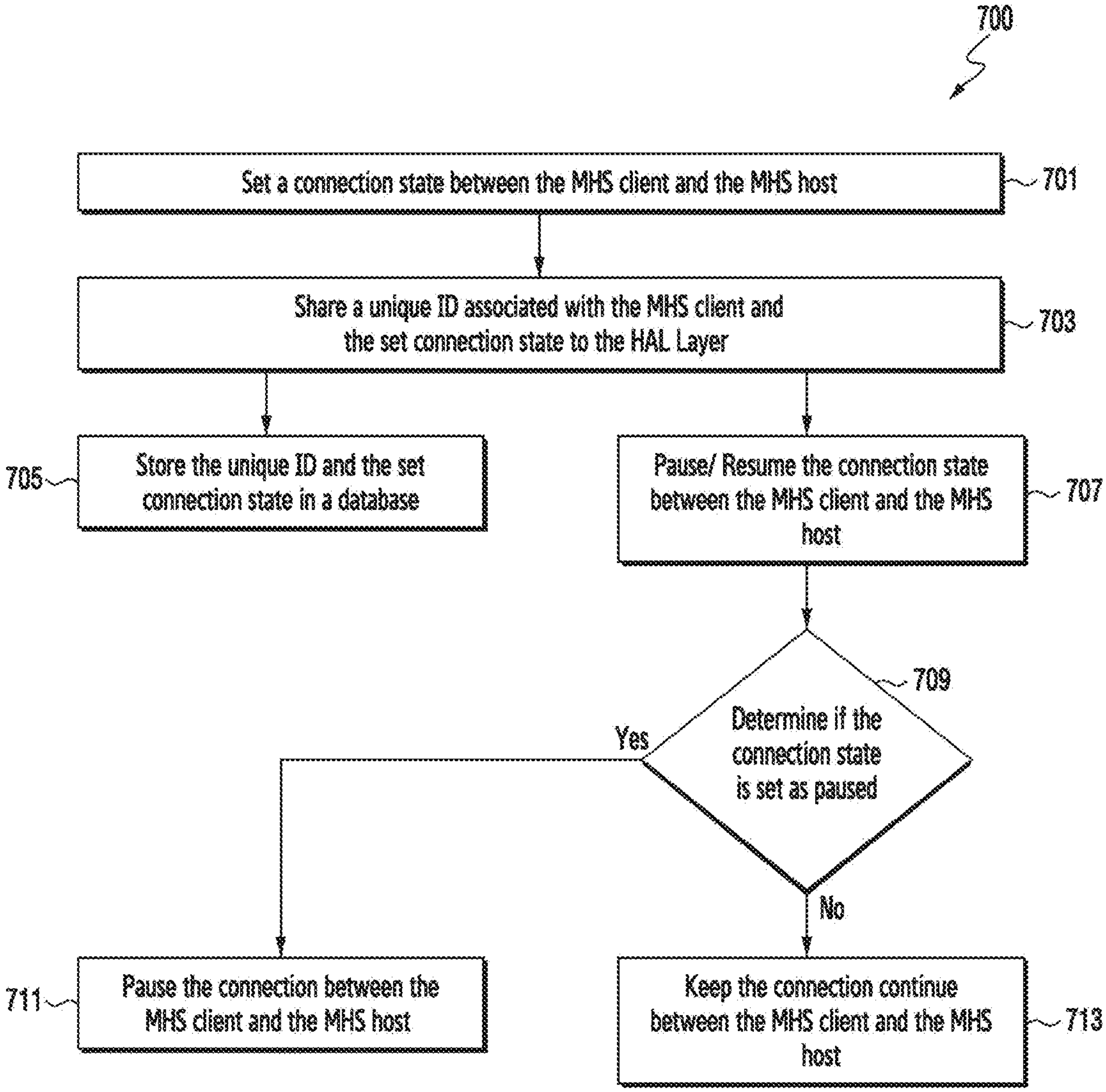
FIG. 7 is a flowchart illustrating example operations for controlling a connection between the MHS client and the MHS host, according to various embodiments.

FIG. 7 is a flowchart 700 illustrating example operations for controlling a connection between the MHS client and the MHS host 101, according to various embodiments. The flowchart 700 includes a series of operations 701 through 713 performed by the processor 105.

At step 701, the processor 105 provides, on the display screen, an option to select the connection state between the selected MHS client and the MHS host 101. For instance, the processor 105 may generate and display a user interface that includes an icon or a dashboard to select (set or change) the connection state between the selected MHS client and the MHS host 101. Further, the processor 105 may receive a fourth user input indicative of selecting the connection state between the selected MHS client and the MHS host 101. In a non-limiting example, the fourth user input may be received using various manners such as the voice command input, the touch input, or any other input method. Further, the processor 105 sets the connection state between the selected MHS client and the MHS host 101 based on the fourth user input. The connection state may include one of a pause state or a resume state.

At step 703, the processor 105 controls the framework layer 201 to share the unique ID associated with the selected MHS client and information of the set connection state to the HAL Layer 207.

At step 705, the processor 105 stores the unique ID associated with the selected MHS client and the set connection state in the database 115. For instance, the framework layer 201 updates the database 115 with the unique ID and the set connection state.

At step 707, the processor 105 receives the fifth user input to set the connection state between the MHS client and the MHS host 101.

At step 709, the processor 105 determines whether the connection state is set as the pause state or the resume state. If it is determined that the connection state is set as the pause state, the flow of the process proceeds to step 711. Further, if it is determined that the connection state is set as the resume state, the flow of the process proceeds to step 713.

At step 711, the processor 105 pauses the connection between the MHS client and the MHS host 101. For instance, the framework layer 201 may control the eBPF filter 203 to pause the connection between the MHS client and the MHS host 101. The eBPF filter 203 may pause the connection by dropping all data packets in the ingress filter and the egress filter of the eBPF filter 203. The dropping of packet may refer to not allowing the transfer of the data packets between the selected MHS client and the MHS host 101.

At step 713, the processor 105 may continue or resume the connection between the MHS client and the MHS host 101. For instance, the framework layer 201 may control the eBPF filter 203 to continue or resume the connection between the MHS client and the MHS host 101. The eBPF filter 203 may continue or resume the connection by allowing all data packets in the ingress filter and the egress filter of the eBPF filter 203.

Figure 8:
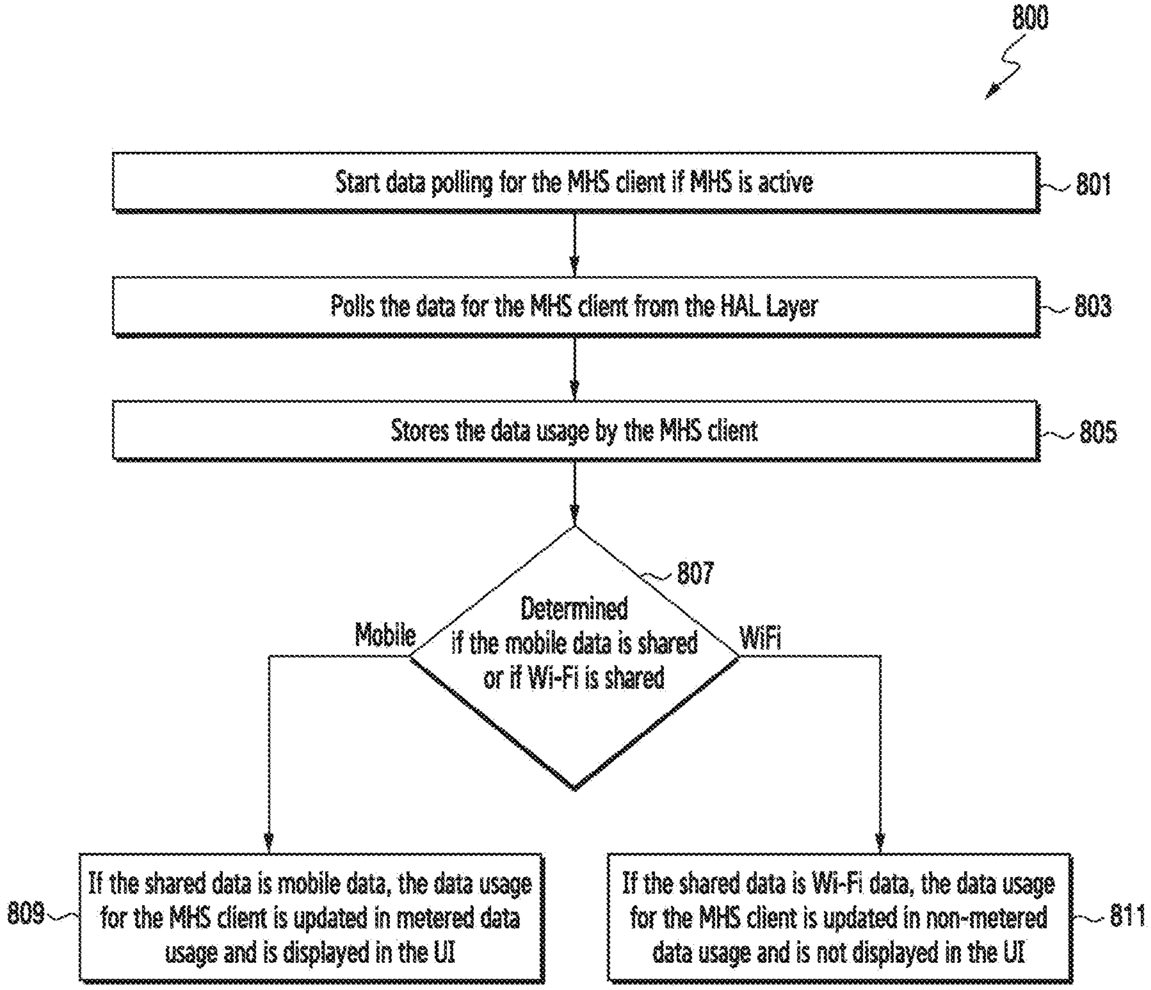
FIG. 8 is a flowchart illustrating example operations of data usage polling to check for data limits associated with the MHS client, according to various embodiments.

FIG. 8 is a flowchart 800 illustrating an example operation of data usage polling to check for data limits associated with the MHS client, according to various embodiments. The flowchart 800 includes a series of operations 801 through 811 performed by the processor 105.

At step 801, the processor 105 starts data polling for the MHS client if the MHS is active. For instance, at first, the processor 105 determines whether the MHS is ON. If the MHS is ON, the processor 105 notifies the framework layer 201 to start the data usage polling.

At step 803, the processor 105 performs the data usage polling for the MHS client. For instance, the framework layer 201 polls the data from the HAL Layer 207.

At step 805, the processor 105 stores the data usage of the MHS client in the database 115. For instance, the framework layer 201 requests the eBPF filter 203 to provide the data usage of the MHS client. Further, the framework layer 201 stores the data usage of the MHS client in the client data usage database 115-1 and total data usage in the daily data usage database 115-3. In various embodiments, the processor 105 may store the data usage of each of the plurality of MHS clients 103 in the database 115.

At step 807, the processor 105 determines if the shared data is mobile data or Wi-Fi data. For instance, the framework layer 201 scans the active upstream data and determines whether the active upstream data is the mobile data or the Wi-Fi data. If it is determined that the shared data is the mobile data, the flow of the process proceeds to step 809. Further, if it is determined that the shared data is the Wi-Fi data, the flow of the process proceeds to step 811.

At step 809, if the shared data is the mobile data, the processor 105 updates the data usage for the MHS client in metered data usage and displays the updated data usage of the MHS client on the display screen.

At step 811, if the shared data is the Wi-Fi data, the processor 105 updates the data usage for the MHS client in non-metered data usage, and updated non-metered data is not displayed on the display screen.

In various embodiments, the processor 105 may also display real-time data usage of the plurality of MHS clients 103 and an overall data limit for the plurality of MHS clients 103. For instance, the application layer 205 may perform the processing to display the real-time data usage and the overall data limit for the plurality of MHS clients 103 on the display screen of the MHS host 101. Further, the processor 105 may provide the option on the display screen to set or modify the overall data limit for the plurality of MHS clients 103. For instance, the processor 105 may enable the MHS host 101 to input or modify the overall data limit for the plurality of MHS clients 103. For example, the processor 105 may generate and display the UI that includes an input field to input the overall data limit for the plurality of MHS clients 103. Further, the processor 105 may receive the third user input indicative of the setting or modification of the overall data limit. For instance, the overall data limit may be set for per day, per month, or any selective duration. In a non-limiting example, the third user input may be received using various methods such as the voice command input, the touch input, or any other input method. Thereafter, the processor 105 controls the data usage of the plurality of MHS clients 103 based on the modified overall data limit.

In various embodiments, the processor 105 may also display, on the display screen, a data usage pattern of the plurality of MHS clients 103 over a predefined time duration. The predefined time duration may be per day, per month, or any selective duration. The processor 105 may display the data usage pattern in a graphical form. The data usage pattern is displayed to enable the MHS host 101 to analyze the data shared for the predefined time duration.

In various embodiments, the processor 105 may also generate a One Time Password (OTP) or Quick-Response (QR) code for connecting a new MHS client to the MHS host 101. The processor 105 may also control or set an access level for the new MHS client connected via the OTP or the QR code. The access level is set such that the new MHS client has limited access in comparison to the MHS client that is connected via a regular hotspot connection.

In various embodiments, the connection between the new MHS client and the MHS host 101 using the OTP or the QR code is valid only for one hotspot session. In the event if the MHS host 101 and/or the MHS client is turned OFF and then turned ON again, the OTP shared previously becomes invalid and the MHS host 101 will reject any new client connection with the old OTP shared.

Furthermore, the connection between the new MHS client with the MHS host 101 using the OTP or the QR code is established when Hotspot Wi-Fi network security is WPA2-PSK.

Figure 9:
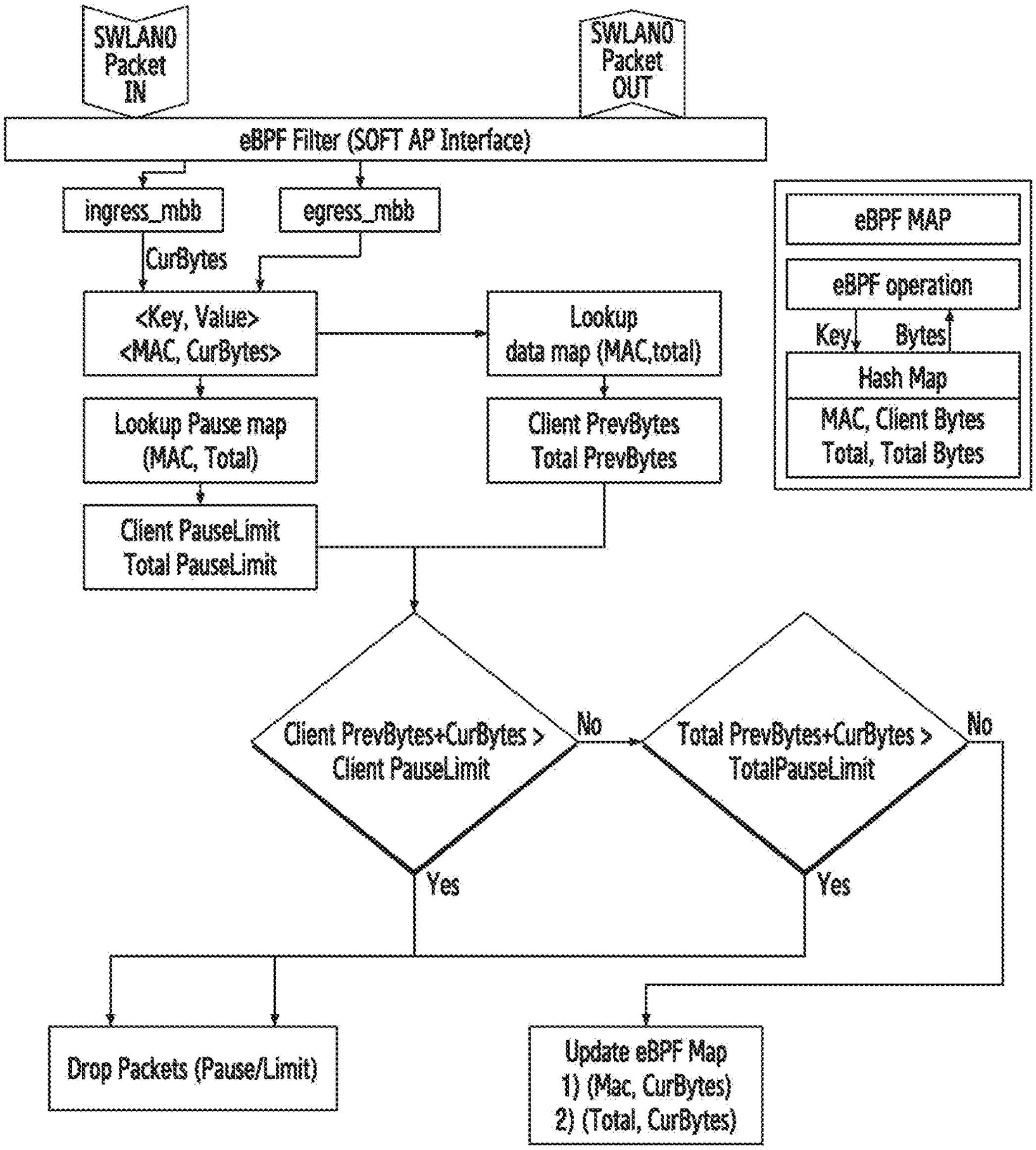
FIG. 9 is a flowchart illustrating example operations for an eBPF filter in the MHS host to monitor and control the plurality of MHS clients, according to various embodiments.

FIG. 9 is a process flow diagram illustrating an example flow for the eBPF filter 203 in the MHS host 101 to monitor and control the plurality of MHS clients 103, according to various embodiments.

As shown in FIG. 9, to monitor and control the plurality of MHS clients 103, the eBPF filter 203 is plugged into the softAP interface. The incoming and outgoing data packets reach the ingress filter (ingress_mbb) and egress filter (egress_mbb) of the eBPF filter 203. The eBPF filter 203 fetched the current data usage, along with the unique ID of the MHS client (client MAC). Further, an eBPF lookup routine is called on a data map with the two keys: client MAC and total. the data usage of each MHS client (per-client bytes) and total data usage (total softAP previous bytes) are fetched by the eBPF lookup routine. Next, the set data limit (pause limit) for the plurality of MHS clients 103 (the global softAP) and each MHS client (per client) is fetched using the eBPF lookup routing. The upstream data packet is dropped if the summation of the current bytes (data usage) exceeds the set data limit (previous global or per-client limit). Otherwise, the data map is updated with the length of Curbytes in both per-client and total data usage.

Figure 10:
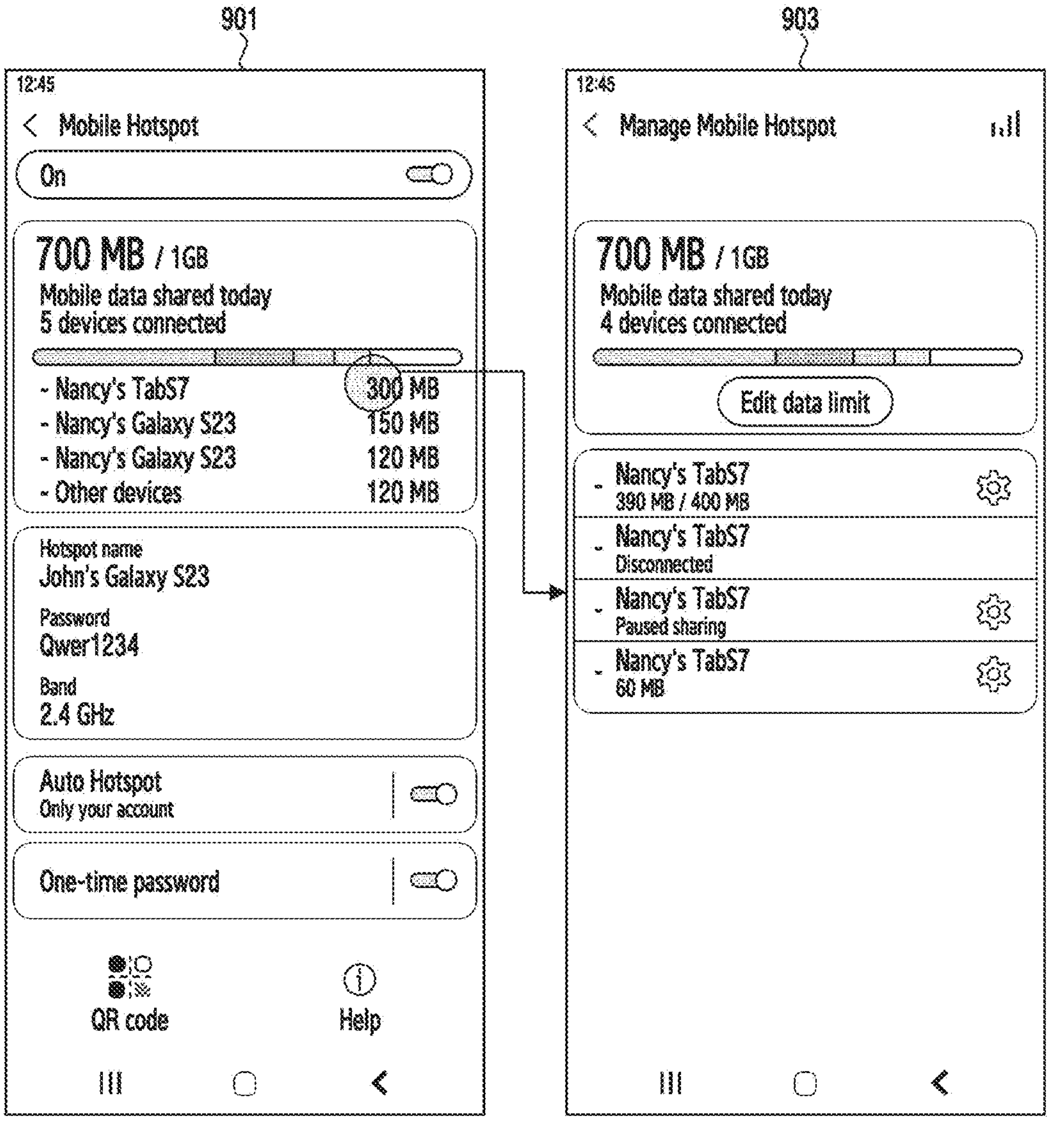
FIG. 10 is a diagram illustrating an example of a display of a list of the plurality of MHS clients and a statistic of the data usage of the plurality of MHS clients, according to various embodiments.

FIG. 10 is a diagram illustrating an example of a display of a list of the plurality of MHS clients 103 and a statistic of the data usage of the plurality of MHS clients 103, according to various embodiments. FIG. 10 shows a first User Interface (UI) 901 displayed on the display screen of the MHS host 101. The first UI 901 includes information of the plurality of MHS clients 103 connected with the MHS host 101. The first UI 901 also includes information of the shared data that is shared for the plurality of MHS clients 103. In various embodiments, the processor 105 monitors the plurality of MHS clients 103 and the data usage of each of the plurality of MHS clients 103 to generate the first UI 901 and a second UI 903.

Further, a user associated with the MHS host 101 may select the displayed information of the plurality of MHS clients 103 to view the second UI 903 that includes the list of the plurality of MHS clients 103 and the statistic of the data usage of the plurality of MHS clients 103. For instance, the second UI 903 may include a plurality of user-selectable icons (a plurality of user-selectable fields) corresponding to the list of the plurality of MHS clients 103. The statistics of the data usage include the data limit and the data usage of each of the plurality of MHS clients 103. Further, the second UI 903 also includes the input field to input the overall data limit for the plurality of MHS clients 103. In various embodiments, the user may perform the selection or input operation using one of the voice commands, the touch input, or any other input method.

Figure 11:
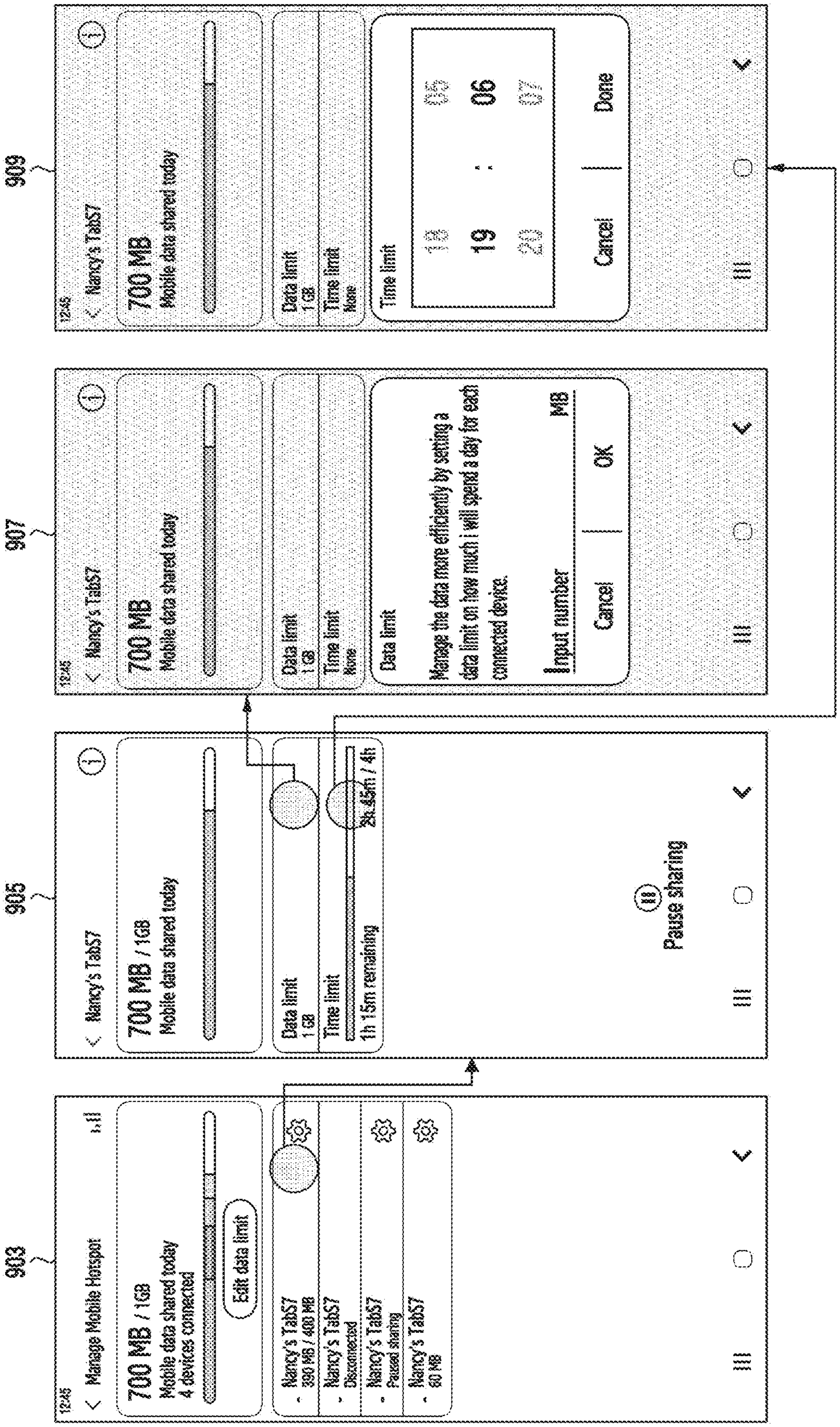
FIG. 11 is a diagram illustrating an example of setting of the data limit for the plurality of MHS clients, according to various embodiments.

FIG. 11 is a diagram illustrating an example of setting of the data limit for the plurality of MHS clients 103, according to various embodiments.

FIG. 11 shows the second UI 903 displayed on the display screen of the MHS host 101. The second UI 903 includes the plurality of user-selectable icons corresponding to the list of the plurality of MHS clients 103. The user performs a selection operation to select the MHS client among the plurality of MHS clients 103. The user may perform the selection operation using one of the voice commands, a touch input, or any other input method.

On performing the selection operation to select the MHS client, the processor 105 generates a third UI 905 that includes icons (fields) corresponding to the data limit and the time limit for the metered data usage for the selected MHS client. Here, the user may further perform the selection operation to select the one of the icons corresponding to the data limit or the time limit.

On performing the selection operation to select the icon corresponding to the data limit, the processor 105 generates a fourth UI 907 that includes the input field to set or modify the data limit for the metered data usage for the selected MHS client. The user may perform the input operation on the input field using one of the voice commands, the touch input, or any other input method.

Further, On performing the selection operation to select the icon corresponding to the time limit, the processor 105 generates a fifth UI 909 that includes the input field to set or modify the time limit for the metered data usage for the selected MHS client. The user may perform the input operation on the input field using one of the voice commands, the touch input, or any other input method.

Figure 12:
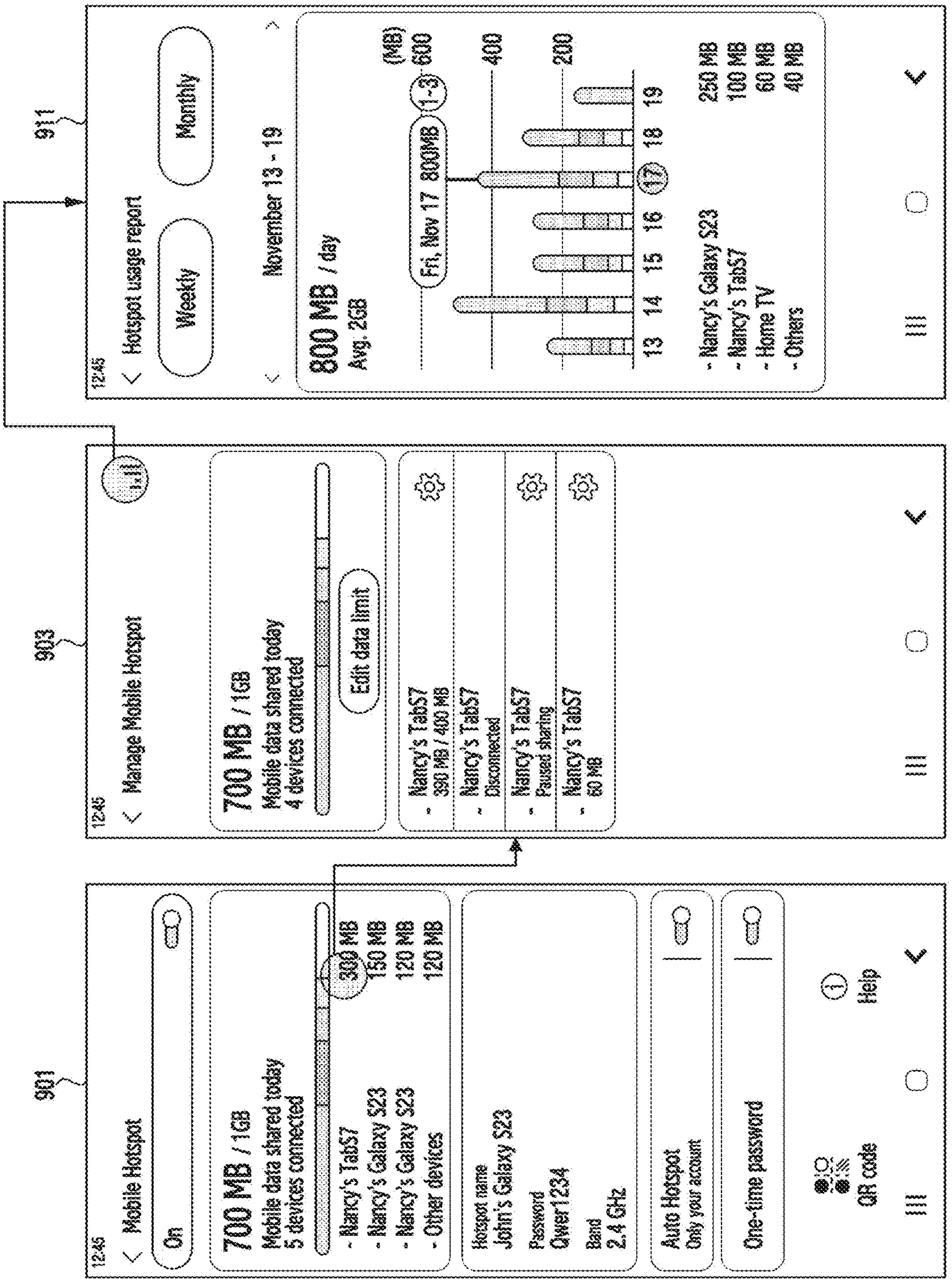
FIG. 12 is a diagram illustrating an example of generation of the data usage pattern of the plurality of MHS clients, according to various embodiments.

FIG. 12 is a diagram illustrating an example of generation of the data usage pattern of the plurality of MHS clients 103, according to various embodiments.

FIG. 12 shows the second UI 903 displayed on the display screen of the MHS host 101. The second UI 903 further includes an icon corresponding to the data usage pattern of the plurality of MHS clients 103. The user performs a selection operation to select the icon corresponding to the data usage pattern. The user may perform the selection operation using one of the voice commands, the touch input, or any other input method.

On performing the selection operation to select the icon corresponding to the data usage pattern, the processor 105 generates a sixth UI 911 that includes the data usage pattern over the predefined time duration displayed in the graphical form. The predefined time duration may be per day, per month, or any selective duration.

Figure 13:
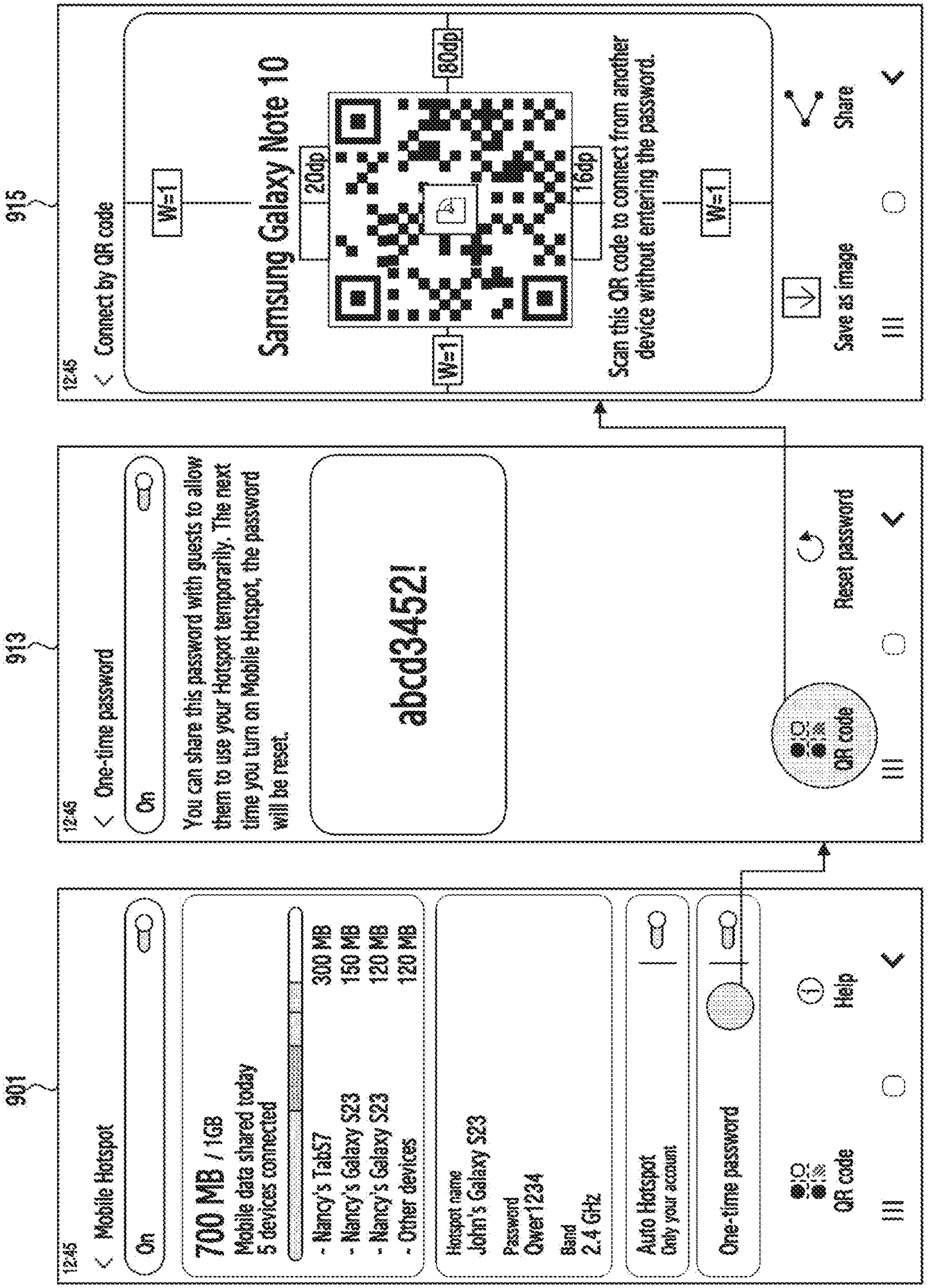
FIG. 13 is a diagram illustrating an example of generation of a One Time Password (OTP) for connecting a new MHS client to the MHS host, according to various embodiments.

FIG. 13 is a diagram illustrating an example of generation of the OTP for connecting the new MHS client to the MHS host 101, according to various embodiments.

FIG. 13 shows the first UI 901 displayed on the display screen of the MHS host 101. The first UI 901 further includes an icon corresponding to the generation of the OTP for connecting the new MHS client to the MHS host 101. The user may perform a selection operation on the icon to generate the OTP. The user may perform the selection operation using one of the voice commands, the touch input, or any other input method.

On performing the selection operation to generate the OTP, the processor 105 generates a seventh UI 913 that includes the generated OTP. In various embodiments, the generated OTP may comprise an alphanumeric OTP, a numeric OTP, or any other combination thereof.

Further, the seventh UI 913 also includes an icon corresponding to the generation of the QR code for connecting the new MHS client to the MHS host 101. The user may perform a selection operation on the icon to generate the QR code. The user may perform the selection operation using one of the voice commands, the touch input, or any other input method. On performing the selection operation to generate the QR code, the processor 105 generates an eighth UI 913 that includes the generated QR code. In various embodiments, the connection between the new MHS client and the MHS host 101 using the OTP or the QR code is valid only for the one hotspot session.

Figure 14:
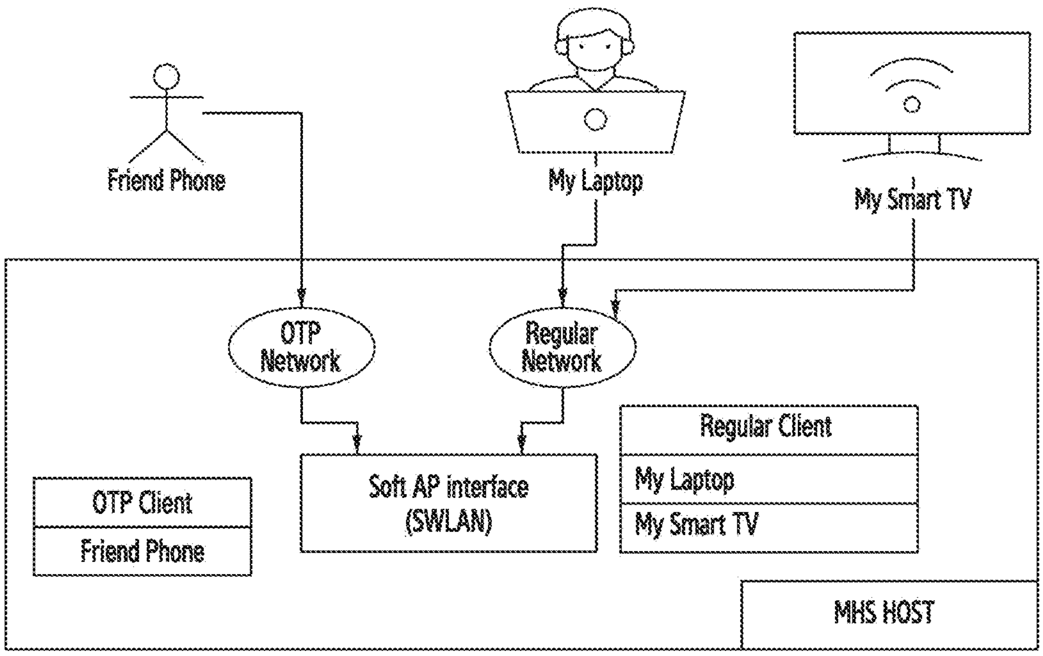
FIG. 14 is a diagram illustrating an example use case scenario where an OTP client is bifurcated for providing enhanced security; according to various embodiments.

FIG. 14 is a diagram illustrating an example use case scenario where OTP clients are bifurcated for providing enhanced security; according to various embodiments.

FIG. 14 depicts an example where OTP clients are bifurcated to provide enhanced security. In the MHS host 101, clients connected via a regular network (RN) (connected via MHS passwords) and the clients connected via OTP network (ON), share the same interface. Embodiments herein disclose a system that ensures the security of the RN clients. Additionally, the system also considers the security of the ON clients. The security refers to the discoverability and the communication amongst the client in an intra-network environment. The MHS host 101 provides a rule-based method that differentiates the RN and ON clients. Both the RN and ON users use the same interface in the soft access point interface of the MHS host 101. However, the MHS host 101 maintains a ruleset that has the unique identifier of each client connected to the RN and ON respectively. The software-based bifurcation helps to improve the security of the RN clients by completely bifurcating the access of ON clients to the RN clients.

Further, the users in the RN may communicate amongst themselves upon the acceptance of each other. However, the ON network may not be able to discover or communicate with the RN network. For example, a "Friend phone" is connected in the ON, and "My Laptop", "My Smart TV", are connected in the ON. In the disclosed method, "Friend Phone" cannot discover the RN network devices. However, "My laptop", connected via the RN, can discover, connect, and communicate with the "My Smart TV" in the same network.

Further, if multiple devices are connected to the ON network, the ON clients may not be discoverable as each ON client acts as an independent identity. For example, if "My friend 1" and "My friend 2" are connected via ON. Then, "My Friend 1" will be isolated from "My friend 2" though connected in the ON network. This ensures the security of the individual clients in the ON network.

Figure 15:
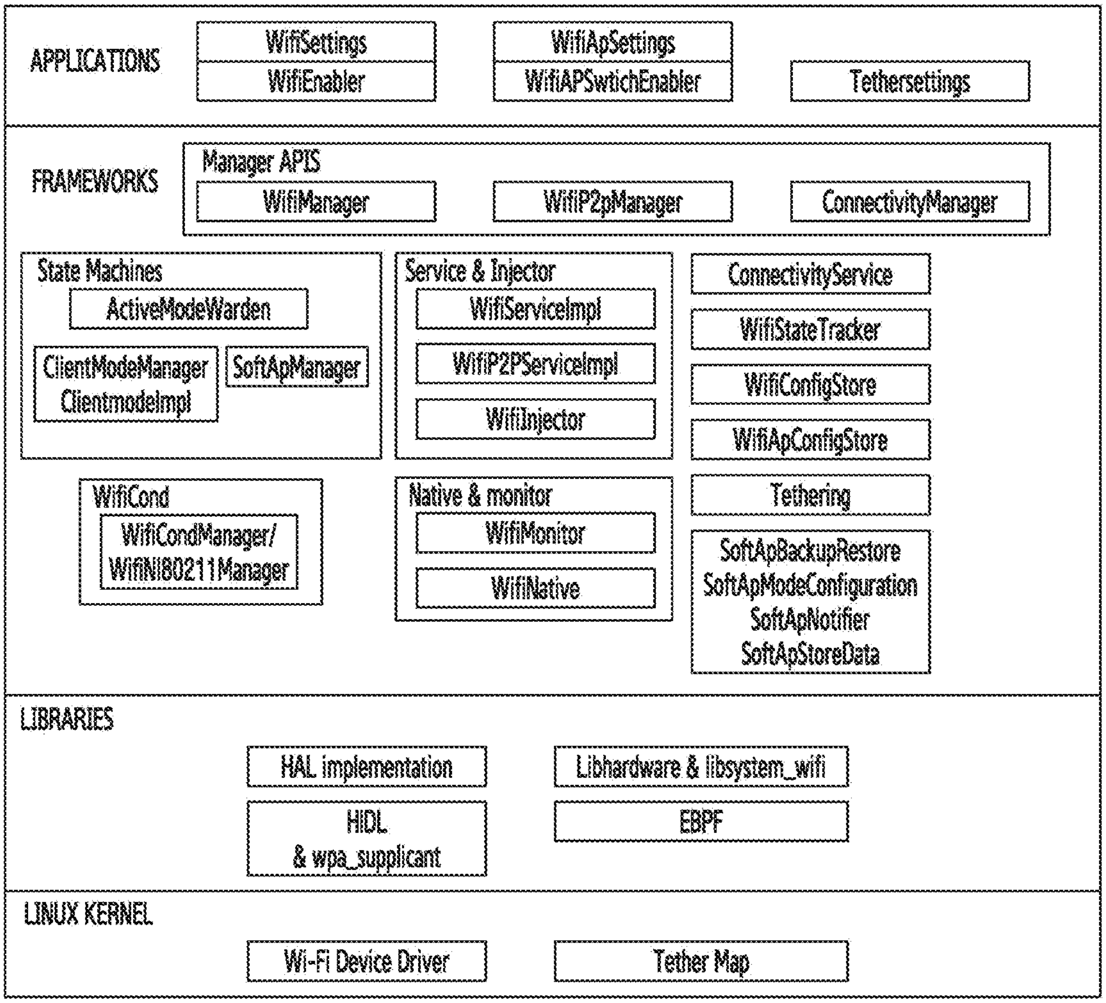
FIG. 15 is a diagram illustrating an example of a plurality of layers related to the MHS host 101, according to various embodiments.

FIG. 15 is a diagram illustrating an example of a plurality of layers related to the MHS host 101, according to various embodiments.

MHS host 101 may comprise an application layer (e.g. Application layer 205 in FIG. 2), a framework layer (e.g. framework layer 201 in FIG. 2), and a Netd layer. The application layer 205 may comprise WifiApSettings, WifiApEditSettings, WifiApConnectedDevicesSettings, WifiApConnectedClient, WifiApConnectedDeviceDetailView, and/or WifiApOne TimePasswordSettings. The framework layer may comprise SemWifiApClientLowLevelDetails, SemWifiApClientUsageSettingDbHelper, SemWifiApEbf, SemWifiApSessionDataUsage, SemWifiApClientDetails, and/or SemWifiApServiceImpl. The netd layer may comprise MobileBBController, NetworkManagementService, OemNetdListener, OemNetdListener, and/or ss_netd.

The application layer (e.g. WifiApSettings) may interact with the framework layer functions using AIDL (Android Interface Definition Language) that uses IPC (Inter-Process Communication) mechanism to communicate with each other.

The following abbreviations and definitions have been referred to herein:

SemWifiApTetheredClientInfo: Regarding the connected devices in Android device, ipserver is being used instead of dnsmasq. Fetching of IP client devices is shown.

TetheringManager sends the device connected/disconnected information by "onClientsChangedCallback" to SemWifiApTetheredClientInfo.

SemWifiApSessionDataUsage: This component is responsible for Session Data Usage

SemWifiApClientDetails: This component is responsible for Client Details.

SemWifiApClientUsageSettingDbHelper: This component is responsible for Client Usage Setting Db.

SemWifiApClientLowLevelDetails: This component is responsible for Client Internal Level Details.

SemWifiApEbf: This component is responsible for interaction between Netd and eBPF and semwifi service module.

Figure 16:
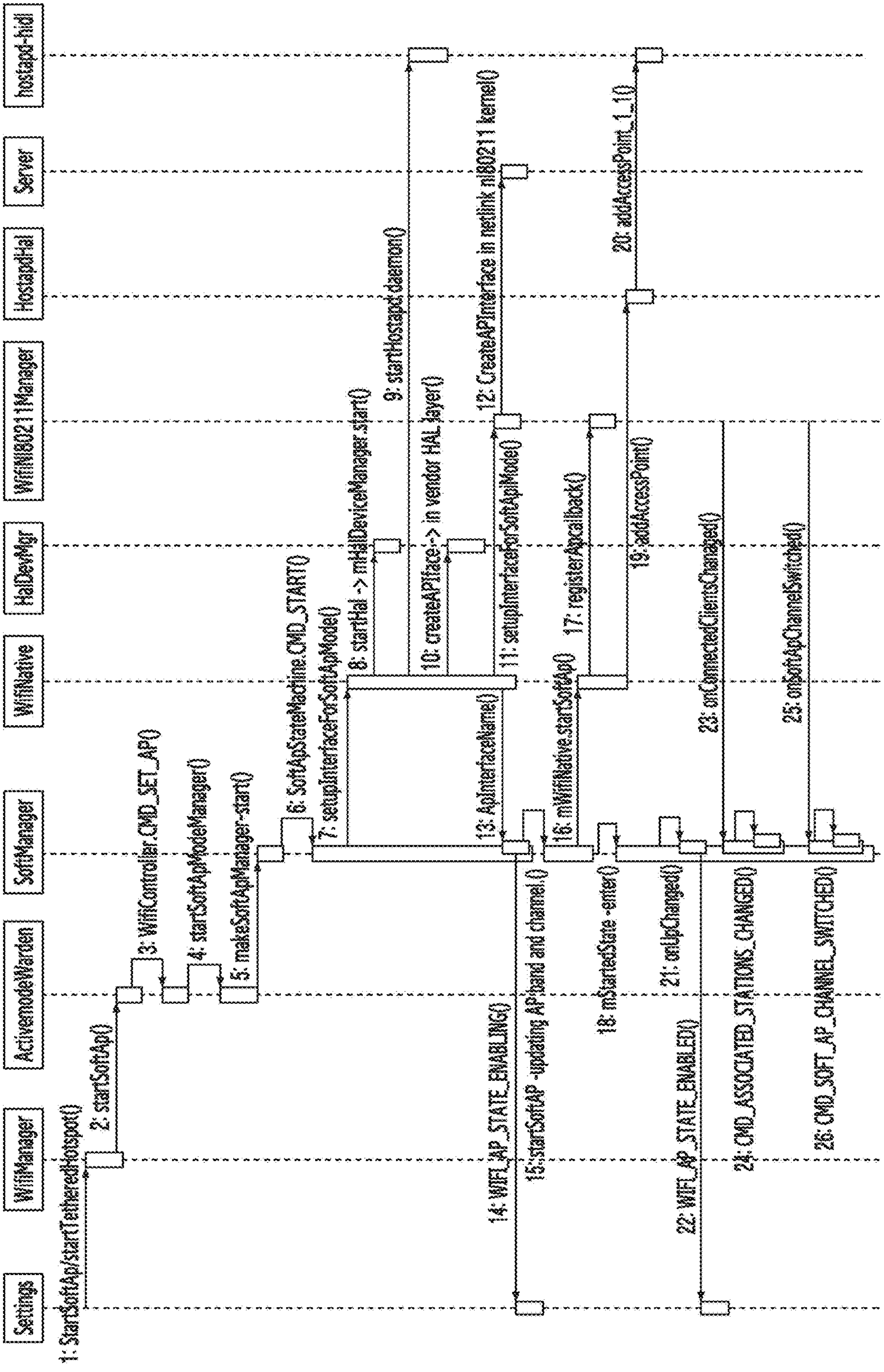
FIG. 16 is a diagram illustrating an example of a sequence diagram related to the MHS host 101, according to various embodiments.

FIG. 16 is a diagram illustrating an example of a sequence diagram related to the MHS host 101, according to various embodiments.

Referring to FIG. 16, step 1 to step 26 are a sequence related to a call flow for an UI-framework (including wpa-supplicant) function call flow at the MHS host 101.

Figure 17:
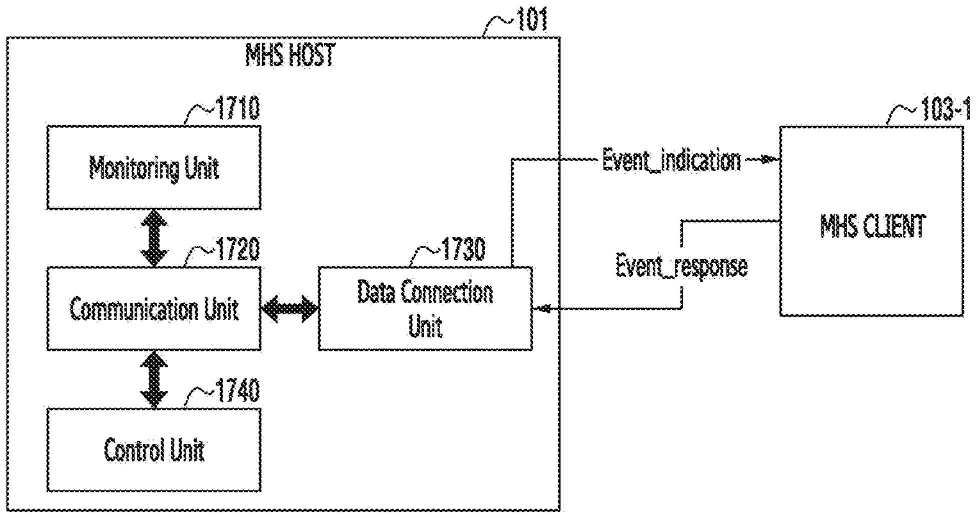
FIG. 17 is a diagram illustrating an example of a method of communication between the MHS host 101 and MHS client, according to various embodiments.

FIG. 17 is a diagram illustrating an example of a method of communication between the MHS host 101 and MHS client, according to various embodiments.

Referring to FIG. 17, in this method, the MHS host 101 may communicate with MHS client either using the existing method of communication or by establishing a new method of communication.

The MHS host 101 may comprise a monitoring unit 1710, a communication unit 1720, data connection unit 1730, and/or control unit 1740.

The monitoring unit may collect required statistics of a MHS client 103-1 connected to the MHS host 101. The statistics of the MHS client 103-1 may comprise at least one of data usage on metered interface, data usage on non-metered interface, timer for the metered interface, timer for non-metered interface, the band information of the connected client, link speed of the MHS client 103-1, probable estimated end-to-end speed of the MHS client 103-1, type of client, and/or so on.

If a specific attention is required to/from the MHS client 103-1, such as 90% of data is used, then the monitoring unit 1710 may indicate the communication unit 1720 via message. The communication unit 1720 may either use an already existing method of communication via commonly connected application interface or may establish, via data connection unit 1730 a new connection in specific to the communication between the MHS host 101 and the MHS client 103-1. The example of existing communication may be "commonly used mail account or chat client-server" application or a simple messaging service to indicate the information. On the other hand, the connection may involve establishing a new communication socket and sharing the message in a specific TLV (type-length-value) format.

The event may be sent to the MHS client 103-1. The MHS client 103-1 may take necessary action based on the received event and share an event response to the MHS host 101. This is a request to the MHS host 101 device and might be acted upon. The entire discretion of the control may be as per the MHS host 101 action. There might be special clients which may override the control even when host does not respond to specific request. On the decision being taken by the MHS host 101 or by the special clients, the control unit 1740 may take an appropriate action.

There also can exist messages in which the MHS client 103-1 may request certain data, such as its data usage, time left, the Radio access type (4G/5G) of the MHS host 101 upstream to make appropriate decisions in advance.

In an example, the module(s) and/or the unit(s) and/or model(s) may include a program, a subroutine, a portion of a program, a software component, or a hardware component, or any combination thereof, capable of performing a stated task or function. As used herein, the module(s) and/or the unit(s) and/or model(s) may be implemented on a hardware component such as a server independently of other modules, or a module can exist with other modules on the same server, or within the same program. The module(s) and/or unit(s) and/or model(s) may be implemented on a hardware component such as processor one or more microprocessors, microcomputers, microcontrollers, digital signal processors, central processing units, state machines, logic circuitries, and/or any devices that manipulate signals based on operational instructions. The module(s) and/or unit(s) and/or model(s), when executed by the processor(s), may be configured to perform any of the described functionalities.

The present disclosure provides various technical benefits and advantages. The present disclosure outlines a series of technical advancements aimed at enhancing monitoring and control capabilities by the MHS host. Additionally, a novel method is introduced to connect specific groups of users via a one-time password, providing enhanced security and access control. A unique "pause internet" per client feature is introduced, enabling selective control over heavy internet activity without disconnecting the client. Further, the method provides a feature of control data sharing which allows the MHS host to manage data sharing by setting limits (data and time). This ensures efficient resource allocation and prevents and/or reduces excessive data usage. Further, the method provides a feature of displaying real-time traffic on the MHS host mobile screen. The display of the real-time traffic helps the MHS host to monitor and control the data consumption of the connected devices.

A method implemented in a Mobile Hotspot (MHS) host for managing a plurality of MHS clients, may comprise monitoring the plurality of MHS clients connected to the MHS host and a data usage of each of the plurality of MHS clients. The method may comprise displaying, on a display of the MHS host, a list of the plurality of MHS clients and information on the data usage of each of the plurality of MHS clients. The method may comprise providing, via the display, a first screen to manage an MHS client among the plurality of MHS clients. The method may comprise receiving a first input to select the MHS client among the plurality of MHS clients. The method may comprise, based on the selection of the MHS client, providing, via the display, a second screen to set at least one of a data limit for the selected MHS client or a time limit for the selected MHS client.

The method may comprise receiving a second input to set at least one of the data limit for the selected MHS client or the time limit for the selected MHS client. The method may comprise controlling the data usage of the selected MHS client based on the second input.

The method may comprise storing a unique ID associated with the selected MHS client and one of the set data limit or the time limit in a database of the selected MHS host. The method may comprise fetching information of data consumed by the selected MHS client for each session, wherein the information of the data consumed includes an amount of the data consumed by the selected MHS client and a time duration for which data is consumed. The method may comprise comparing the information of data consumed by the selected MHS client with one of the set data limit or the time limit. The method may comprise controlling, based on a result of comparison that the data consumed by the selected MHS client reaches one of the set data limit or the time limit, a connection between the selected MHS client and the MHS host.

The method may comprise pausing the connection between the selected MHS client and the MHS host.

The method may comprise providing, via the display, a third screen to select a connection state between the selected MHS client and the MHS host. The method may comprise receiving a third input to select the connection state, wherein the connection state is one of a pause state or a resume state. The method may comprise storing a unique ID associated with the selected MHS client and information of the selected connection state in a database of the MHS host. The method may comprise controlling, based on the selected connection state, a connection between the selected MHS client and the MHS host.

The method may comprise one of pausing or resuming the connection between the selected MHS client and the MHS host.

The method may comprise displaying, via the display, real-time data usage of the plurality of MHS clients and an overall data limit for the plurality of MHS clients. The method may comprise providing, via the display, an option to modify the overall data limit for the plurality of MHS clients. The method may comprise receiving a third input to modify the overall data limit. The method may comprise controlling the data usage of the plurality of MHS clients based on the modified overall data limit.

The method may comprise displaying, via the display, a data usage pattern of the plurality of MHS clients over a specified time duration.

The method may comprise generating a One Time Password (OTP) for connecting a new MHS client to the MHS host.

A connection between the new MHS client and the MHS host using the OTP may be valid for one hotspot session. The connection between the new MHS client with the MHS host using the OTP may be established based on Hotspot Wi-Fi network security being WPA2-PSK.

The method may comprise controlling an access level of the new MHS client connected via the OTP such that the new MHS client has limited access in comparison to the MHS client connected via a regular hotspot connection.

The data limit or the time limit for the selected MHS client may be set for one of: per day, per month, or any selective duration.

A Mobile Hotspot (MHS) host configured to manage a plurality of MHS clients, may comprise at least one processor, comprising processing circuitry and a display screen coupled with at least one processor. At least one processor, individually and/or collectively, may be configured to monitor the plurality of MHS clients connected to the MHS host and a data usage of each of the plurality of MHS clients. At least one processor, individually and/or collectively, may be configured to control the MHS host to display, via the display, a list of the plurality of MHS clients and information on the data usage of the plurality of MHS clients. At least one processor, individually and/or collectively, may be configured to provide, via the display, a first screen to manage an MHS client among the plurality of MHS clients. At least one processor, individually and/or collectively, may be configured to receive a first input indicative of a selection of the MHS client among the plurality of MHS clients.

At least one processor, individually and/or collectively, may be configured to provide, via the display based on the selection of the MHS client, an option to set one of a data limit for metered data usage or a time limit for the metered data usage for the selected MHS client. At least one processor, individually and/or collectively, may be configured to receive a second input to set at least one of the data limit for the selected MHS client or the time limit for the selected MHS client. At least one processor, individually and/or collectively, may be configured to control the data usage of the selected MHS client based on the second input.

At least one processor, individually and/or collectively, may be configured to store a unique ID associated with the selected MHS client and one of the set data limit or the time limit in a database of the MHS host. At least one processor, individually and/or collectively, may be configured to fetch information of data consumed by the selected MHS client for each session, wherein the information of the data consumed includes an amount of the data consumed by the selected MHS client and a time duration for which data is consumed. At least one processor, individually and/or collectively, may be configured to compare the information of data consumed by the selected MHS client with one of the set data limit or the time limit. At least one processor, individually and/or collectively, may be configured to control, based on a result of comparison that the data consumed by the selected MHS client reaches at least one of the set data limit or the time limit, a connection between the selected MHS client and the MHS host.

At least one processor, individually and/or collectively, may be configured to pause the connection between the selected MHS client and the MHS host.

At least one processor, individually and/or collectively, may be configured to provide, via the display, a third screen to select a connection state between the selected MHS client and the MHS host. At least one processor, individually and/or collectively, may be configured to receive a third input indicative of a selection of the connection state, wherein the connection state is one of a pause state or a resume state. At least one processor, individually and/or collectively, may be configured to store a unique ID associated with the selected MHS client and information of the selected connection state in a database of the MHS host. At least one processor, individually and/or collectively, may be configured to control, based on the selected connection state, a connection between the selected MHS client and the MHS host.

At least one processor, individually and/or collectively, may be configured to one of pause or resume the connection between the selected MHS client and the MHS host.

At least one processor, individually and/or collectively, may be configured to control the MHS host to display, via the display, real-time data usage of the plurality of MHS clients and an overall data limit for the plurality of MHS clients. At least one processor, individually and/or collectively, may be configured to provide, via the display, an option to modify the overall data limit for the plurality of MHS clients. At least one processor, individually and/or collectively, may be configured to receive a third input to modify the overall data limit. At least one processor, individually and/or collectively, may be configured to control the data usage of the plurality of MHS clients based on the modified overall data limit.

At least one processor, individually and/or collectively, may be configured to control the MHS host to display, via the display, a data usage pattern of the plurality of MHS clients over a specified time duration.

A method implemented in a Mobile Hotspot (MHS) host for managing a plurality of MHS clients, may comprise monitoring the plurality of MHS clients connected to the MHS host and a data usage of each of the plurality of MHS clients. The method may comprise displaying, on a display screen of the MHS host, a list of the plurality of MHS clients and a statistic of the data usage of the plurality of MHS clients. The method may comprise providing, on the display screen, an option to manage an MHS client from the plurality of MHS clients. The method may comprise receiving a first input indicative of a selection of the MHS client from the plurality of MHS clients. The method may comprise providing, on the display screen based on the selection of the MHS client, an option to set at least one of a data limit for metered data usage or a time limit for the metered data usage for the selected MHS client. The method may comprise receiving a second input indicative of a setting of the data limit or the time limit for the selected MHS client. The method may comprise controlling the data usage of the selected MHS client based on the setting of the data limit and/or the time limit.

The method may comprise storing a unique ID associated with the selected MHS client and one of the set data limit or the time limit in a database of the MHS host. The method may comprise fetching information of data consumed by the selected MHS client for each session, wherein the information of the data consumed includes an amount of the data consumed by the selected MHS client and a time duration for which data is consumed. The method may comprise comparing the information of data consumed by the selected MHS client with one of the set data limit or the time limit. The method may comprise controlling, based on a result of comparison that the data consumed by the selected MHS client reaches one of the set data limit or the time limit, a connection between the selected MHS client and the MHS host.

The method may comprise pausing the connection between the selected MHS client and the MHS host.

The method may comprise providing, on the display screen, an option to select a connection state between the selected MHS client and the MHS host. The method may comprise receiving a third input indicative of a selection of the connection state, wherein the connection state is one of a pause state or a resume state. The method may comprise storing a unique ID associated with the selected MHS client and information of the selected connection state in a database of the MHS host. The method may comprise controlling, based on the selected connection state, a connection between the selected MHS client and the MHS host.

The method may comprise one of pausing or resuming the connection between the selected MHS client and the MHS host.

The method may comprise displaying, on the display screen, real-time data usage of the plurality of MHS clients and an overall data limit for the plurality of MHS clients. The method may comprise providing, on the display screen, an option to modify the overall data limit for the plurality of MHS clients. The method may comprise receiving a third input indicative of a modification of the overall data limit. The method may comprise controlling the data usage of the plurality of MHS clients based on the modified overall data limit.

The method may comprise displaying, on the display screen, a data usage pattern of the plurality of MHS clients over a specified time duration.

The method may comprise generating a One Time Password (OTP) for connecting a new MHS client to the MHS host.

A connection between the new MHS client and the MHS host using the OTP may be valid for one hotspot session. The connection between the new MHS client with the MHS host using the OTP may be established based on Hotspot Wi-Fi network security being WPA2-PSK.

The method may comprise controlling an access level of the new MHS client connected via the OTP such that the new MHS client has limited access in comparison to the MHS client connected via a regular hotspot connection.

The data limit or the time limit for the selected MHS client may be set for one of: per day, per month, or any selective duration.

A Mobile Hotspot (MHS) host configured to manage a plurality of MHS clients, may comprises at least one processor, comprising processing circuitry; and a display screen coupled with at least one processor. At least one processor, individually and/or collectively, may be configured to monitor the plurality of MHS clients connected to the MHS host and a data usage of each of the plurality of MHS clients. At least one processor, individually and/or collectively, may be configured to control the MHS to display, on the display screen, a list of the plurality of MHS clients and a statistic of the data usage of the plurality of MHS clients. At least one processor, individually and/or collectively, may be configured to provide, on the display screen, an option to manage an MHS client from the plurality of MHS clients. At least one processor, individually and/or collectively, may be configured to receive a first input indicative of a selection of the MHS client from the plurality of MHS clients. At least one processor, individually and/or collectively, may be configured to provide, on the display screen based on the selection of the MHS client, an option to set one of a data limit for metered data usage or a time limit for the metered data usage for the selected MHS client. At least one processor, individually and/or collectively, may be configured to receive a second input indicative of a setting at least one of the data limit or the time limit for the selected MHS client. At least one processor, individually and/or collectively, may be configured to control the data usage of the selected MHS client based on the setting of the data limit or the time limit.

At least one processor, individually and/or collectively, may be configured to store a unique ID associated with the selected MHS client and one of the set data limit or the time limit in a database of the MHS host. At least one processor, individually and/or collectively, may be configured to fetch information of data consumed by the selected MHS client for each session, wherein the information of the data consumed includes an amount of the data consumed by the selected MHS client and a time duration for which data is consumed. At least one processor, individually and/or collectively, may be configured to compare the information of data consumed by the selected MHS client with one of the set data limit or the time limit. At least one processor, individually and/or collectively, may be configured to control, based on a result of comparison that the data consumed by the selected MHS client reaches at least one of the set data limit or the time limit, a connection between the selected MHS client and the MHS host.

At least one processor, individually and/or collectively, may be configured to pause the connection between the selected MHS client and the MHS host.

At least one processor, individually and/or collectively, may be configured to provide, on the display screen, an option to select a connection state between the selected MHS client and the MHS host. At least one processor, individually and/or collectively, may be configured to receive a third input indicative of a selection of the connection state, wherein the connection state is one of a pause state or a resume state. At least one processor, individually and/or collectively, may be configured to store a unique ID associated with the selected MHS client and information of the selected connection state in a database of the MHS host. At least one processor, individually and/or collectively, may be configured to control, based on the selected connection state, a connection between the selected MHS client and the MHS host.

At least one processor, individually and/or collectively, may be configured to one of pause or resume the connection between the selected MHS client and the MHS host.

At least one processor, individually and/or collectively, may be configured to control the MHS host to display, on the display screen, real-time data usage of the plurality of MHS clients and an overall data limit for the plurality of MHS clients. At least one processor, individually and/or collectively, may be configured to provide, on the display screen, an option to modify the overall data limit for the plurality of MHS clients. At least one processor, individually and/or collectively, may be configured to receive a third input indicative of a modification of the overall data limit. At least one processor, individually and/or collectively, may be configured to control the data usage of the plurality of MHS clients based on the modified overall data limit.

At least one processor, individually and/or collectively, may be configured to control the MHS host to display, on the display screen, a data usage pattern of the plurality of MHS clients over a specified time duration.

At least one processor, individually and/or collectively, may be configured to generate a One Time Password (OTP) for connecting a new MHS client to the MHS host.

A connection between the new MHS client and the MHS host using the OTP may be valid for one hotspot session. The connection between the new MHS client with the MHS host using the OTP may be established based on Hotspot Wi-Fi network security being WPA2-PSK.

At least one processor, individually and/or collectively, may be configured to control an access level of the new MHS client connected via the OTP such that the new MHS client has limited access in comparison to the MHS client connected via a regular hotspot connection.

The data limit or the time limit for the selected MHS client may be set for one of per day, per month, or any selective duration.

The various actions, acts, blocks, steps, or the like in the flowcharts and diagrams may be performed in the order presented, in a different order, or simultaneously. Further, in various embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the disclosed concept as taught herein. The drawings and the forgoing description give examples of embodiments. Those skilled in the art will appreciate that one or more of the described elements may well be combined into a single functional element. Certain elements may be split into multiple functional elements. Elements from one embodiment may be added to another embodiment. It will also be understood that any of the embodiment(s) described herein may be used in conjunction with any other embodiment(s) described herein.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. In one embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "Ist" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, in one embodiment, the module may be implemented in a form of an Application-Specific Integrated Circuit (ASIC).

One or more embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In one embodiment, an operational procedure according to one or more embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. A method implemented in a Mobile Hotspot (MHS) host for managing a plurality of MHS clients, the method comprising:

monitoring the plurality of MHS clients connected to the MHS host and a data usage of each of the plurality of MHS clients;

displaying, on a display of the MHS host, a list of the plurality of MHS clients and information on the data usage of each of the plurality of MHS clients;

providing, via the display, a first screen to manage an MHS client among the plurality of MHS clients;

receiving a first input to select the MHS client among the plurality of MHS clients;

based on the first input, providing, via the display, a second screen to set at least one of a data limit for the selected MHS client or a time limit for the selected MHS client;

receiving, on the second screen, a second input to set at least one of the data limit for the selected MHS client or the time limit for the selected MHS client;

storing a unique ID associated with the selected MHS client and one of the set data limit or the time limit in a database of the MHS host;

fetching information regarding data consumed by the selected MHS client for each session, wherein the information regarding the data consumed includes an amount of the data consumed by the selected MHS client and a time duration for which data is consumed;

comparing the information regarding data consumed by the selected MHS client with one of the set data limit or the time limit; and controlling, based on determining that the data consumed by the selected MHS client reaches one of the set data limit or the time limit, a connection between the selected MHS client and the MHS host.

2. The method as claimed in claim 1, wherein controlling the connection between the selected MHS client and the MHS host comprises pausing the connection between the selected MHS client and the MHS host.

3. The method as claimed in claim 1, further comprising:

providing, via the display, a third screen to select a connection state between the selected MHS client and the MHS host;

receiving a third input to select the connection state, wherein the connection state is one of a pause state or a resume state;

storing a unique ID associated with the selected MHS client and information regarding selected connection state in a database of the MHS host; and controlling, based on the selected connection state, a connection between the selected MHS client and the MHS host.

4. The method as claimed in claim 3, wherein controlling the connection between the selected MHS client and the MHS host comprises one of pausing or resuming the connection between the selected MHS client and the MHS host.

5. The method as claimed in claim 1, further comprising:

displaying, via the display, real-time data usage of the plurality of MHS clients and an overall data limit for the plurality of MHS clients;

providing, via the display, an option to modify the overall data limit for the plurality of MHS clients;

receiving a third input to modify the overall data limit; and controlling the data usage of the plurality of MHS clients based on the modified overall data limit.

6. The method as claimed in claim 1, further comprising displaying, via the display, a data usage pattern of the plurality of MHS clients over a specified time duration.

7. The method as claimed in claim 1, further comprising generating a One Time Password (OTP) for connecting a new MHS client to the MHS host.

8. The method as claimed in claim 7, wherein a connection between the new MHS client and the MHS host using the OTP is valid for one hotspot session, and the connection between the new MHS client with the MHS host using the OTP is established based on Hotspot Wi-Fi network security being WPA2-PSK.

9. The method as claimed in claim 7, further comprising controlling an access level of the new MHS client connected via the OTP such that the new MHS client has limited access in comparison to the MHS client connected via a regular hotspot connection.

10. The method as claimed in claim 1, wherein the data limit or the time limit for the selected MHS client is set for one of: per day, per month, or any selected duration.

11. A Mobile Hotspot (MHS) host configured to manage a plurality of MHS clients, the MHS host comprising:

at least one processor, comprising processing circuitry; and a display screen coupled with at least one processor, wherein at least one processor, individually and/or collectively, is configured to:

monitor the plurality of MHS clients connected to the MHS host and a data usage of each of the plurality of MHS clients;

display, via the display, a list of the plurality of MHS clients and information on the data usage of the plurality of MHS clients;

provide, via the display, a first screen to manage an MHS client among the plurality of MHS clients;

receive a first input indicative of a selection of the MHS client among the plurality of MHS clients;

based on the first input, provide, via the display, a second screen to set at least one of a data limit for the selected MHS client or a time limit for the selected MHS client;

receive, on the second screen, a second input to set at least one of the data limit for the selected MHS client or the time limit for the selected MHS client;

store a unique ID associated with the selected MHS client and one of the set data limit or the time limit in a database of the MHS host;

fetch information regarding data consumed by the selected MHS client for each session, wherein the information regarding the data consumed includes an amount of the data consumed by the selected MHS client and a time duration for which data is consumed;

compare the information regarding data consumed by the selected MHS client with one of the set data limit or the time limit; and control, based on determining that the data consumed by the selected MHS client reaches one of the set data limit or the time limit, a connection between the selected MHS client and the MHS host.

12. The MHS host of claim 11, wherein at least one processor, individually and/or collectively, is configured to pause the connection between the selected MHS client and the MHS host.

13. The MHS host of claim 11, wherein at least one processor, individually and/or collectively, is configured to:

provide, via the display, a third screen to select a connection state between the selected MHS client and the MHS host;

receive a third input indicative of a selection of the connection state, wherein the connection state is one of a pause state or a resume state;

store a unique ID associated with the selected MHS client and information regarding the selected connection state in a database of the MHS host; and control, based on the selected connection state, a connection between the selected MHS client and the MHS host.

14. The MHS host of claim 13, wherein at least one processor, individually and/or collectively, is configured to perform one of pausing or resuming the connection between the selected MHS client and the MHS host.

15. The MHS host of claim 11, wherein at least one processor, individually and/or collectively, is configured to:

control the MHS host to display, via the display, real-time data usage of the plurality of MHS clients and an overall data limit for the plurality of MHS clients;

provide, via the display, an option to modify the overall data limit for the plurality of MHS clients;

receive a third input to modify the overall data limit; and control the data usage of the plurality of MHS clients based on the modified overall data limit.

16. The MHS host of claim 11, wherein at least one processor, individually and/or collectively, is configured to control the MHS host to display, via the display, a data usage pattern of the plurality of MHS clients over a specified time duration.

* * * * *